US006921609B2

United States Patent
Lampe-Onnerud et al.

(10) Patent No.: US 6,921,609 B2
(45) Date of Patent: Jul. 26, 2005

(54) GRADIENT CATHODE MATERIAL FOR LITHIUM RECHARGEABLE BATTERIES

(75) Inventors: Christina Lampe-Onnerud, Framingham, MA (US); Per Onnerud, Framingham, MA (US); Jie Shi, Acton, MA (US); Sharon Dalton, Malden, MA (US); Tomoyoshi Koizumi, Iwaki (JP); Aisaku Nagai, Iwaki (JP)

(73) Assignee: Kureha Chemical Industry Co., Ltd., Tokyo (JP)

( * ) Notice: Subject to any disclaimer, the term of this patent is extended or adjusted under 35 U.S.C. 154(b) by 181 days.

(21) Appl. No.: 10/073,674

(22) Filed: Feb. 11, 2002

(65) Prior Publication Data

US 2002/0192552 A1 Dec. 19, 2002

Related U.S. Application Data

(60) Provisional application No. 60/298,791, filed on Jun. 15, 2001, and provisional application No. 60/298,798, filed on Jun. 15, 2001.

(51) Int. Cl.[7] .................................................. H01M 4/52

(52) U.S. Cl. ................. 429/223; 429/231.1; 429/231.3; 429/231.6; 429/231.95; 423/594; 423/596; 423/600; 423/593

(58) Field of Search .......................... 429/223, 231.1, 429/231.3, 231.6, 231.95, 224; 423/593, 594, 596, 600

(56) References Cited

U.S. PATENT DOCUMENTS

| | | |
|---|---|---|
| 5,679,481 A | 10/1997 | Takanishi et al. |
| 6,017,654 A | 1/2000 | Kumta et al. |
| 6,274,272 B1 | 8/2001 | Peres et al. |

FOREIGN PATENT DOCUMENTS

| | | |
|---|---|---|
| EP | 0 993 057 A1 | 4/2000 |
| JP | 2797693 | 6/1992 |

(Continued)

OTHER PUBLICATIONS

Chowdari, B.V.R., et al., "Cathodic behavior of (Co, Ti, Mg)–doped $LiNiO_2$," *Solid State Ionics*, 140:55–62 (2001).

Sun, X., et al., "Studies on Relationship Between Structure of Over–charge State and Thermal Stability for $LiNiO_2$ Based Cathode Materials," *Electrochemical Society Proceedings*, 99(25):268–277 (2000).

*Primary Examiner*—Mark Ruthkosky
(74) *Attorney, Agent, or Firm*—Hamilton, Brook, Smith & Reynolds, P.C.

(57) ABSTRACT

A composition suitable for use as a cathode material of a lithium battery includes a core material having an empirical formula $Li_xM'_zNi_{1-y}M''_yO_2$. "x" is equal to or greater than about 0.1 and equal to or less than about 1.3. "y" is greater than about 0.0 and equal to or less than about 0.5. "z" is greater than about 0.0 and equal to or less than about 0.2. M' is at least one member of the group consisting of sodium, potassium, nickel, calcium, magnesium and strontium. M" is at least one member of the group consisting of cobalt, iron, manganese, chromium, vanadium, titanium, magnesium, silicon, boron, aluminum and gallium. A coating on the core has a greater ratio of cobalt to nickel than the core. The coating and, optionally, the core can be a material having an empirical formula $Li_{x1}A_{x2}Ni_{1-y1-z1}Co_{y1}B_{z1}O_a$. "x1" is greater than about 0.1 a equal to or less than about 1.3. "x2," "y1" and "z1" each is greater than about 0.0 and equal to or less than about 0.2. "a" is greater than 1.5 and less than about 2.1. "A" is at least one element selected from the group consisting of barium, magnesium, calcium and strontium. "B" is at least one element selected from the group consisting of boron, aluminum, gallium, manganese, titanium, vanadium and zirconium.

7 Claims, 17 Drawing Sheets

FOREIGN PATENT DOCUMENTS

| | | |
|---|---|---|
| JP | 06-275275 | 9/1994 |
| JP | 07-235292 | 9/1995 |
| JP | 08-138669 | 5/1996 |
| JP | 08-315819 | 11/1996 |
| JP | 09-17430 | 1/1997 |
| JP | 09-50810 | 2/1997 |
| JP | 09 055210 A | 2/1997 |
| JP | 10-208743 | 8/1998 |
| JP | 10 236826 A | 9/1998 |
| JP | 10-236826 | 9/1998 |
| JP | 10-241691 | 9/1998 |
| JP | 11-40153 | 2/1999 |
| JP | 11 067209 A | 3/1999 |
| JP | 11-92149 | 4/1999 |
| JP | 11-195416 | 7/1999 |
| JP | 11195416 | 7/1999 |
| JP | 2000 195517 A | 7/2000 |
| JP | 2001 143708 A | 5/2001 |
| JP | 2000 149950 A | 5/2003 |

(A)　　　　　(B)　　　　　(C)

GRADIENT CATHODE MATERIAL FOR LITHIUM RECHARGEABLE BATTERIES

RELATED APPLICATION

This application claims the benefit of U.S. Provisional Application Nos. 60/298,791 and 60/298,798, both of which were filed on Jun. 15, 2001, and the entire teachings of both applications are incorporated herein by reference.

BACKGROUND OF THE INVENTION

Lithium-based batteries are used in a variety of applications, such as VTRs, communication devices and portable devices of any type. Traditionally, the lithium battery industry has employed $LiCoO_2$-type materials as the active component of lithium battery cathodes. However, $LiCoO_2$ lithium battery cathodes typically are very expensive and exhibit relatively low capacity, such as a capacity of about 140 mAh/g.

One alternative to the use of $LiCoO_2$-based cathode materials is $LiNiO_2$-based materials, which generally are less expensive, but exhibit higher capacities, such as capacities in excess of about 170 mAh/g. Typically, $LiNiO_2$-based materials employed in lithium battery cathodes have a nickel content of about 80% and a cobalt content of about 20% (atomic weight percent). However, $LiNiO_2$-based materials generally are less safe (i.e. exhibit more gassing) than are $LiCoO_2$-type materials. Further, $LiNiO_2$-based materials exhibit a first cycle efficiency that often is between about five and about ten percent lower than that of $LiCoO_2$-based cathodes. Generally, $LiCoO_2$-based materials have efficiencies in a range of between about 93% and about 96%, whereas $LiNiO_2$-based materials have efficiencies that range from between about 83% to about 88%.

Therefore, a need exists for cathode materials suitable for use in lithium-based batteries that minimize or overcome the above-referenced problems.

SUMMARY OF THE INVENTION

The invention generally is directed to a composition and a method of forming a composition, the composition being suitable for employment in a cathode of a lithium battery. The invention also is directed to a lithium battery that employs a cathode material of the invention.

In one embodiment, the invention is a composition that includes a core having an empirical formula of $Li_xM'_zNi_{1-y}M''_yO_2$. "x" is greater than about 0.1 and equal to less than about 1.3. "y," is greater than about 0.0 and equal to or less than about 0.5. "z" is greater than about 0.0 and equal to or less than about 0.2. M' is at least one member of the group consisting of sodium (Na), potassium (K), nickel (Ni), calcium (Ca), magnesium (Mg) and strontium (Sr). M" is at least one member of the group consisting of cobalt (Co), iron (Fe), manganese (Mn), chromium (Cr), vanadium (V), titanium (Ti), magnesium (Mg), silicon (Si), boron (B), aluminum (Al) and gallium (Ga). A coating on the core has a greater ratio of cobalt to nickel than the core.

In a specific embodiment, the coating on the core has an empirical formula of $Li_{x1}A_{x2}Ni_{1-y1-z1}Co_{y1}Q_zO_a$. "x1" is greater than about 0.1 and equal to or less than about 1.3. "x2," "y1" and "z1" each is greater than 0.0 and equal to or less than about 0.2. "a" is greater than about 1.5 and less than about 2.1. "A" is at least one element selected from the group consisting of barium, magnesium, calcium and strontium. "Q" is at least one element selected from the group consisting of boron, aluminum, gallium, manganese, titanium, vanadium and zirconium.

A method of forming a composition includes drying a water solution of $LiNO_3$ and $Co(NO_3)_2.6H_2O$ in which a core material is immersed, said core material having an empirical formula $Li_xM'_zNi_{1-y}M''_yO_2$. x is greater than about 0.1 and equal to or less than about 1.3, "y," is greater than about 0.0 and equal to or less than about 0.5, and z is greater than about 0.0 and equal to or less than about 0.2. M' is at least one member of the group consisting of sodium, potassium, nickel, calcium, magnesium, and strontium. M" is at least one member of the group consisting of cobalt, iron, manganese, chromium, vanadium, titanium, magnesium, silicon, boron, aluminum and gallium. Evaporation of water from the solution causes formation of a precursor coating on the core material. Thereafter, the precursor coating is calcined to thereby form the composition.

The compositions of the claimed invention generally will exhibit improved capacity, cyclability and safety over $LiCoO_2$ and $LiNiO_2$ counterparts. Further, these compositions typically are less expensive to manufacture than $LiCoO_2$-based materials. Also, the capacity, cyclability and safety of materials employed as cathodes can be manipulated by employing different combinations of dopants in the coating to substitute for lithium and nickel in certain embodiments of the invention. The gradient material on the other hand typically has a matched lattice, which enables a fully functional material similar to the regular oxides in cycling properties, which enables the material to stay intact throughout the life of the battery.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
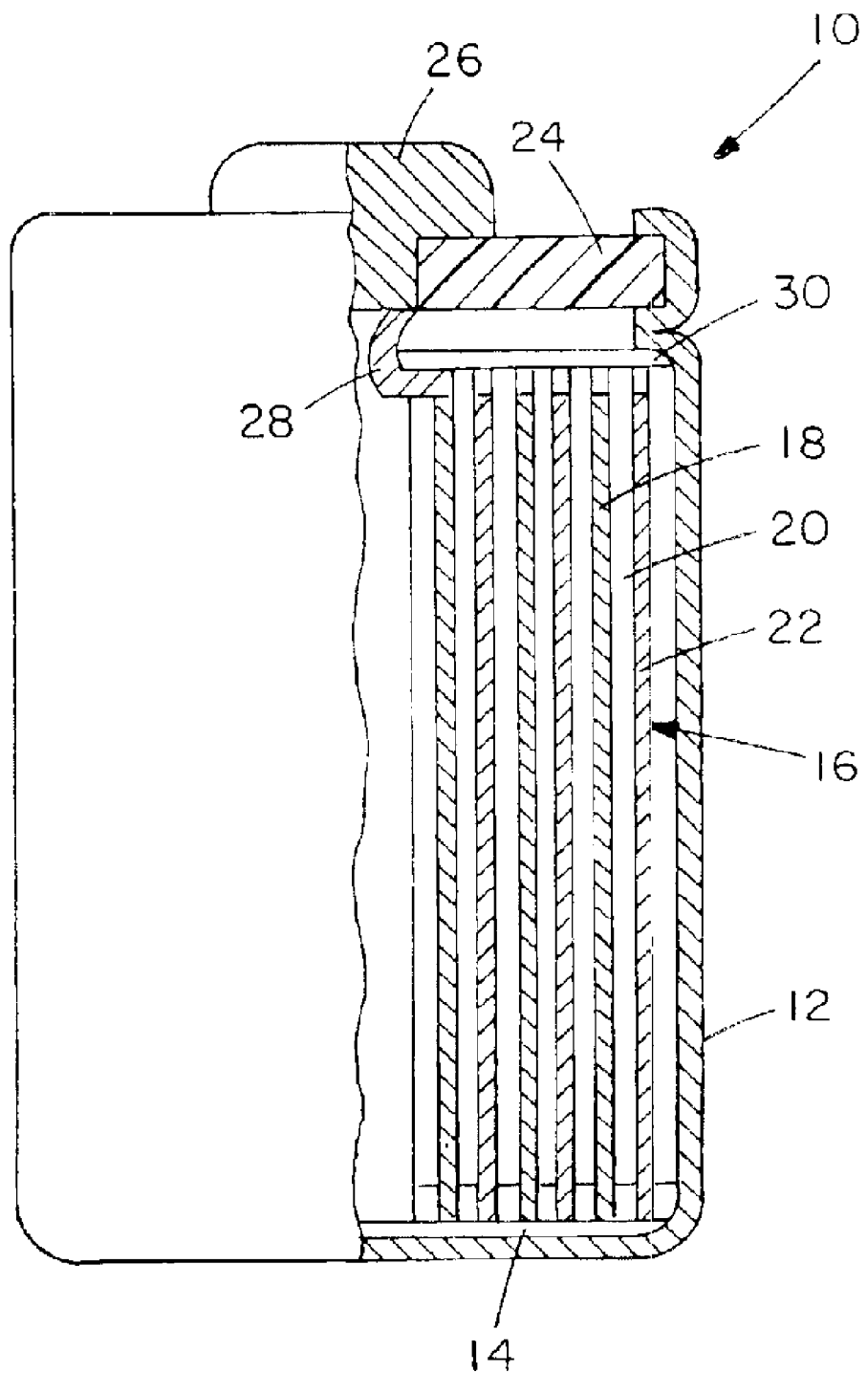
FIG. 1 is a cross section view of a lithium-based battery of the invention and a cathode of the invention.

The above features and other details of the invention now will be described more particularly with reference to the accompanying drawings and pointed out in the claims. It will be understood that the particular embodiments of the invention are shown by way of illustration and not as limitations of the invention. The principal features of this invention can be employed in various embodiments without departing from the scope of the invention.

The present invention generally is directed to a composition, having a core and a coating. The core has an empirical formula of $Li_xM'_zNi_{1-y}M''_yO_2$. The coating on the core has a greater ratio of cobalt to nickel than the core.

In one embodiment, the coating has the empirical formula of: $Li_{x1}A_{x2}Ni_{1-y1-z1}Co_{y1}Q_zO_a$. The crystal structure of the core, and optionally of the coating, is of an "α-NaFeO₂-type" and can be characterized as having a hexagonal lattice within the R-3m group. The composition of the invention is suitable for employment as the active material in cathodes for rechargeable lithium-ion or lithium polymer-type batteries, among other uses. The invention also generally is directed to lithium batteries and to cathodes of lithium batteries that employ the composition of the invention, and to methods of forming the composition.

In one embodiment of the invention, the composition include a core having an empirical formula $Li_xM'_zNi_{1-y}M''_yO_2$ wherein "x" is greater than about 0.1 and equal to or less than about 1.3, "y" is greater than about 0.0 and equal to or less than about 0.5, and "z" is greater than about 0.0 and equal to or less than about 0.2. M' is at least one member of the group consisting of sodium, potassium, nickel, calcium, magnesium and strontium. M" is at least one member of the group consisting of cobalt, iron, manganese, chromium, vanadium, titanium, magnesium, silicon, boron, aluminum and gallium. A coating on the core has a greater ratio of cobalt to nickel than the core.

In a specific embodiment, M" includes cobalt. In another embodiment, "y" is in a range of between about 0.1 and 0.5. In a particularly preferred embodiment, "y" is about 0.1. In another particularly preferred embodiment, "y" is about 0.2.

In another embodiment, M' includes magnesium. In another specific embodiment, M' includes magnesium and M" includes boron. In still another embodiment, M' includes manganese. In one particularly preferred embodiment, M" includes cobalt and boron and, optionally, M' includes magnesium. In another embodiment, M" includes cobalt and manganese, and, optionally, M' includes magnesium. In still another especially preferred embodiment, the sum of "x" and "z" equals about 1.

Generally, the ratio of cobalt to nickel of the composition of the invention increases as a gradient from the core to an outer surface of the coating.

In another embodiment, the core material has an empirical formula $Li_xNi_{0.9-y}Co_{0.1+y}O_2$. "x" is greater than about 0.1 and equal to or less than 1.3. "y" is greater than zero and equal to or less than about 0.4.

In still another embodiment, the core material has an empirical formula, $Li_{x1}A_{x2}Ni_{1-y1-z1}Co_{y1}Q_zO_a$. "x" is greater than about 0.1 and equal to or less than about 1.3. "y" is greater than 0.0 and equal to or less than about 0.4. "v" is equal to or less than about 0.4. "Q" is at least one member of the group consisting of manganese, boron, aluminum and gallium.

In a specific embodiment of the invention, the core material includes $LiNi_{0.8}Co_{0.2}O_2$. In another embodiment, the core material includes $Li_{1.1}Ni_{0.87}Co_{0.1}B_{0.03}O_2$.

In still another embodiment of the invention, the coating has an empirical formula $Li_{x1}A_{x2}Ni_{1-y1-z1}Co_{y1}Q_zO_a$. "x1" is greater than about 0.1 and equal to or less than about 1.3. "x2," "y1" and "z1" each is greater than about 0.0 and equal to or less than about 0.2. "a" is greater than about 1.5 and less than about 2.1. "A" is at least one element selected from the group consisting of barium, magnesium, calcium and strontium. "Q" is at least one element selected from the group consisting of boron, aluminum, gallium, manganese, titanium, vanadium and zirconium. In one preferred embodiment, "A" is magnesium and "Q" is aluminum. In another preferred embodiment, "A" is magnesium and "Q" is manganese.

In one embodiment, the invention is a composition, such as a crystal, wherein a core and a coating of the composition each has an empirical formula: $Li_{x1}A_{x2}Ni_{1-y1-z1}Co_{y1}Q_zO_a$, wherein "x1" is greater than about 0.1 and equal to or less than about 1.3, "x2," "y1" and "z1" each is greater than about 0.0 and equal to or less than about 0.2, and "a" is greater than about 1.5 and less than about 2.1. "A" is at least one element selected from the group consisting of barium, magnesium, calcium and strontium, and "Q" is at least one element selected from the group consisting of aluminum, gallium, manganese, titanium, vanadium and zirconium. The coating has a greater ratio of cobalt to nickel than the core. In one preferred embodiment, "A" is magnesium and "Q" is aluminum. In another preferred embodiment, "A" is magnesium and "Q" is manganese. In still another embodiment, "A" is magnesium and "Q" is gallium.

In another embodiment, the invention is a method of forming a composition. The method includes evaporating water from a solution of $LiNO_3$ and $Co(NO_3)_2·6H_2O$ in which a core material is immersed. The core material has the empirical formula of the composition of the invention. Evaporation of water from the solution causes formation of a precursor coating on the core material. The precursor coating then is calcined to thereby form the composition of the invention. In one embodiment, the amount of coating formed on the core is greater than 0.0 mole percent and less than about 15.0 mole percent of the resulting core and coating. In another embodiment, the amount of coating formed on the core is greater than 5.0 mole percent and less than about 15.0 mole percent of the resulting core and coating. In still another embodiment, the amount of coating formed on the core is greater than 5.0 mole percent and less than about 10.0 mole percent of the resulting core and coating.

In one embodiment, the stoichiometric ratio of $LiNO_3$ to $Co(NO_3)_2 \cdot 6H_2O$ in the solution is in range of between about 0.0 and about 1.2. In another embodiment, the precursor coating is calcined by heating the coating to a temperature in a range of between about 500° C. and about 900° C. for a period of time in a range of between about 0.2 hours and about 12 hours.

In a preferred embodiment, the precursor coating is calcined by heating the coating and the core material at a rate in a range of between about 5° C. and about 100° C. per minute to a temperature in a range of between about 300° C. and about 500° C., which temperature then is maintained for a period of time in a range of between about 0.2 hours and about 4 hours. The precursor coating and the core material then are heated at a rate of between about 5° C. and about 50° C. per minute to a temperature of between about 600° C. and about 900° C., at which temperature the coating then is maintained for a period of time in a range of between about 0.2 hours and about 12 hours.

In another embodiment, the invention is a cathode formed of a composition of the invention suitable for use in a lithium battery. In another embodiment, the invention is a lithium battery employing a cathode that includes a composition of the invention.

A lithium-based battery of the invention, such as a lithium ion battery, a lithium polymer battery, or a lithium battery, is shown partly in cross-section in FIG. 1. As shown therein, lithium-based battery 10 includes case 12. Case 12 is formed of a suitable material, such as stainless steel. Insulator 14 is located at a bottom portion of case 12. Electrode group 16 includes cathode 18, separator 20, and anode 22. Anode 22 also is an embodiment of the invention. Insulating seal plate 24 at an upper opening of case 12 is fixed to case 12 by a suitable method, such as by caulking. Cathode terminal 26 at a central portion of insulating seal plate 24 is connected electrically to cathode lead 28. Cathode lead 28, in turn, is connected electrically to cathode 18 of electrode group 16. Anode 22 of electrode group 16 is connected electrically to case 12 as an anode terminal, via a negative electrode lead (not shown). Lithium-based battery 10 includes several electrode groups, all of which have the same construction. Insulating paper 30 is located above electrode group 16 and has a central opening.

Cathode 18 of the invention includes a composition of the invention as an active material. Cathode 18 also includes a suitable conductive agent, such as acetylene black, carbon black and graphite. A binder, such as polytetrafluoroethylene (PTFE), polyvinylidene fluoride (PVDF), ethylenepropylene-diene copolymer (EPDM) in styrene-butadiene rubber (SBR) also is included in cathode 18. The ratios of active material, conductive agent and binder can be, for example, about 80 to 96 weight percent of the active material, about 2 to 20 weight percent of the conductive agent, and about 2 to 7 weight percent of the binder. The mixed active material, conductive agent and binder are suspended in an appropriate solvent and then coated onto a suitable collector. Examples of suitable collectors are aluminum foil. The composition then is dried to form a thin plate on the collector. Cathodes suitable for use in lithium-based batteries are well-known in the art. Examples of suitable positive electrodes are described in EP 0 688 057 B1, EP 0 573 266 A1, EP 0 763 865 A1, the teachings all of which are incorporated herein by reference in their entirety.

Separator 20 includes a suitable polymer, such as a synthetic resin non-woven fabric, a polyethylene porous film, porous PVDF or a polypropylene porous film, or a suitable glass fiber. Materials suitable for use as separator 20 in a lithium ion battery are well-known in the art, such as is described in the references incorporated by reference above.

Anode 22 includes a coating on a collector. A suitable collector can be formed of, for example, copper foil. The coating includes a polymer component, carbon graphite or hard carbon (amorphous carbon) and an additive. The polymer binder component is a suitable material, such as polyvinylidene fluoride (PVDF), polyamide (PD) and polyvinylidene fluoride-hexafluoropropylene (PVDF-HFP). The polymer binder typically is present in the coating in an amount in a range of between about 1 and about 10 weight percent.

A suitable additive is carbon black or small particulate graphite flakes. An example of a suitable amount of additive in a coating is in a range of between about 0.5 and about 7 percent by weight.

Although not wishing to be bound by any particular theory, the crystal structure of crystals of the invention are believed to be of "$\alpha$-$NaFeO_2$-type," and is in the following described in a hexagonal lattice within a "R-3m" space group. In this structure, Li and "A" atoms occupy the so-called "3a" site in the structure (x=0, y=0, and z=0), the Ni and "Q" atoms occupy the "3b" site (x0, y=0, z=0.5), and oxygen occupies the "6c" site (x=0, y=0, z=z). The "z" coordinate of oxygen changes depending on the nature of "A" and "Q" elements and their relative ratios. Typically the "z" coordinate is between 0.22 and 0.26. The cell parameters of this material, "a" and "c," also varies with the chemical composition. Typically, cell parameters are found between the following ranges: a=2.75–2.95 Å, and c=13.9–14.3 Å. Generally, the cell parameters exhibit a gradient through the particle structure. Also there is a gradient of diminishing nickel concentration from the core to the surface of each particle. The gradient particulate structure typically produces a diffraction pattern that has asymmetric Bragg reflection peaks when subjected to X-ray diffraction (XRD). This peak asymmetry is a "fingerprint" of the gradient material of the invention and provides experimental evidence that the material has a gradually changing elemental composition.

Coatings of the cathode materials of the current invention can improve the safety of Ni-based materials at the same time as capacity is maintained or improved, although the Ni-atoms are diluted. This is made possible by the simultaneous substitution of atoms in both the Li-site (3a-site) and the Ni-site (3b site). "A" atoms partly substitute for Li atoms in the 3a site "Q" atoms substitute for Ni in the 3b site. Further, the capacity and cyclability is higher due to higher stabilization of the structure than that found in the $LiCoO_2$ system. This means that more lithium can be removed from the structure without having a structural collapse. It is believed that safety is high compared to $LiNiO_2$ due to shielding of the 3b—3b interaction, which is the dominating mode for structural collapse. This enables less structure damage upon cycling and higher stability at the lower Li contents at about x=0.2, which is the traditional cut-off for the LiNiO$_2$ systems, especially for compounds containing about 20% Co. Polarization behavior of the composition of the invention can lead to higher capacity for devices that utilize a 3.5 volt cut-off for the electronics.

Characteristics of the cathode materials of the invention relate to capacity, cyclability, and safety. For example, compositions of the invention can exhibit different capacities depending on the charge/discharge rate and other external conditions, such as electrolyte choice and electrode formulation. "Capacity" is defined herein as the number of Li ions that can reversibly be removed from the crystal structures of lithium-based materials, such as those of the invention. "Reversibility," as defined herein, means that the structure substantially maintains its integrity and that Li can be intercalated back to restore the initial crystal structure. In theory, this is the definition of capacity at an infinitely small rate.

"Safety," as defined herein, means structural stability or structural integrity; if a material decomposes during cycling or is easily decomposed or causes gassing at elevated temperatures, the material is considered unsafe. Polarization behavior adds yet another dimension to capacity. Materials having a high voltage profile will have improved capacity especially when discharge ends at 3.5V, which is a technology constraint for many semiconductive electronic circuits. This is the case for cellular phones, for example, wherein typically one lithium battery cell is used, but less of a concern for other devices, such as laptop computers, that utilize multiple batteries.

Based on the lithium content, capacities of both LiCoO$_2$ and LiNiO$_2$ should be just about equal, since they contain the same amount of Li ions. Practically this is not the case. The LiCoO$_2$ material allows only about 50% Li extraction while in LiNiO$_2$ one can reversibly remove about 80% of Li ions. After this critical amount of Li is removed, the crystal structure of a metal oxide irreversibly changes, i.e. a structural collapse takes place. The structural collapse is not preferred in a Li-ion battery as it contributes to capacity degradation and lower cyclability. The over-charge is also a safety concern.

Figure 2:
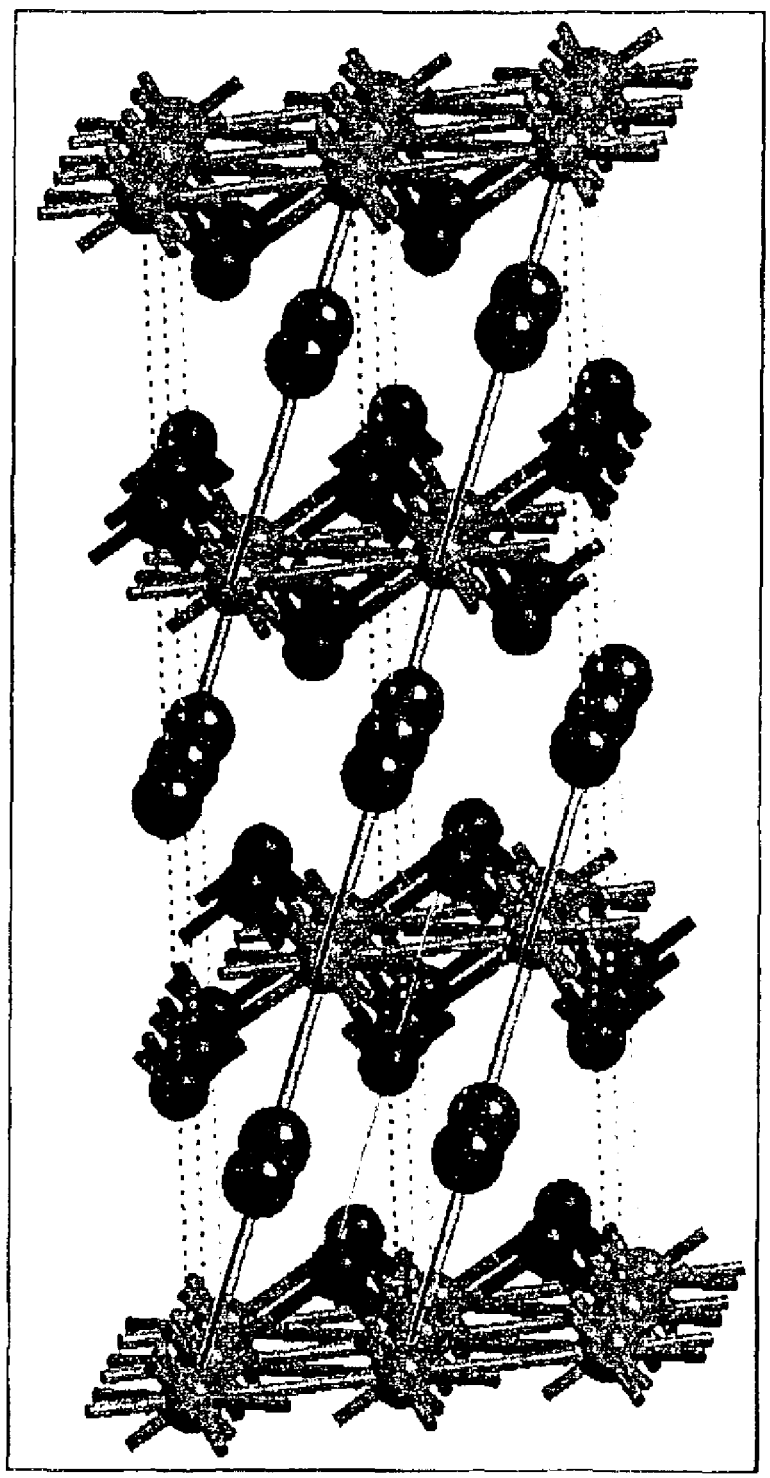
FIG. 2 is a three dimensional representation of a crystal structure of the invention.
Figure 3:
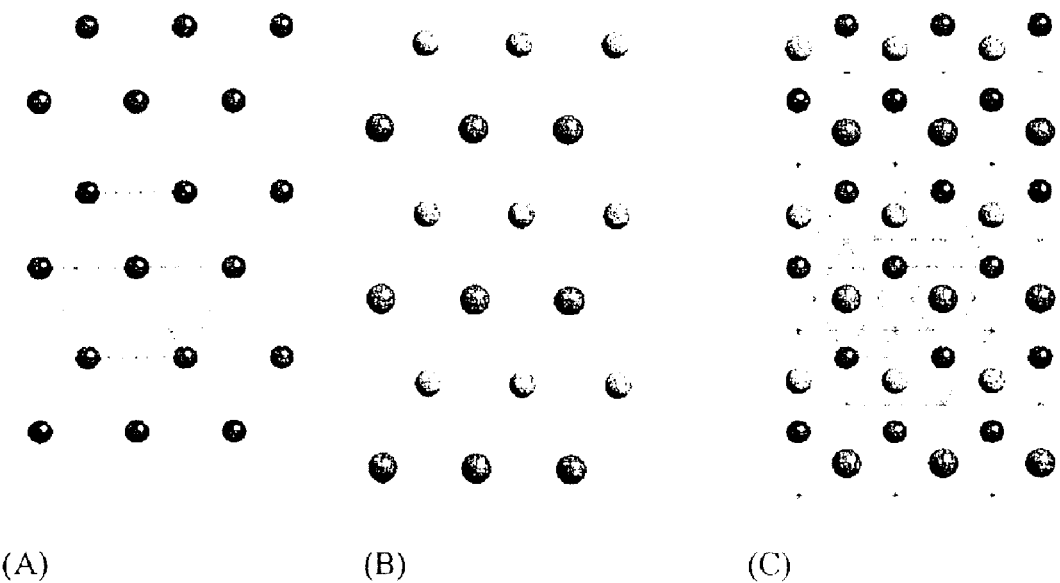
FIGS. 3A through 3C are representations of oxygen, metal and combined oxygen and metal planes in a crystal structure having the empirical formula $LiMO_2$ projected along the (012) plane.

The structural reason for this collapse is described below. The crystal structure of layered LiMO$_2$ is shown in FIG. 2. Intuitively, it is not obvious that the crystal if FIG. 2 will collapse, i.e. drastically reduce the distance between the MO$_2$ layers, when Li ions are removed from the structure. One would expect that the negatively charged neighbors (oxygen atoms) repel after the positively charged ions are removed. This should cause quite an opposite effect; the crystal should expand. However, this is shown not to be the case. Instead it is instructive to look at in the (012) family of crystallographic planes in the LiMO$_2$ structure, which are shown in FIG. 2. The sequence of these planes is depicted in FIG. 3. The crystal consists of alternating slightly distorted hexagonal metal/oxygen layers. The metal layer consists of both Li M (Co/Ni/Q) atoms, while the oxygen layer contains only oxygen atoms. This view of the structure helps to understand why the crystal is not repelling when the Li-ion layers are removed even in a simplistic ionic model. In fact, as seen from FIG. 3, when the Li atoms are removed from the structure, M-atoms still remain in the metal plane and keep the structure stable.

The crystal is kept together by interaction of oxygen and metal planes. The metal planes consist of alternating rows of Li/A and Ni/Co/Q atoms. When Li atoms are removed, the metal plane becomes partially depopulated, which should result in an overall decease in structural stability. Another conclusion that we have drawn simply from structural considerations is that, when Li is removed, it leaves behind a quasi 1-dimensional string of M(Ni,Co,Q) atoms in the (012) plane which should be thermodynamically less stable and thus should have a strong tendency to diffuse into sites that were formerly occupied by Li atoms.

Figures 4A, 4B:
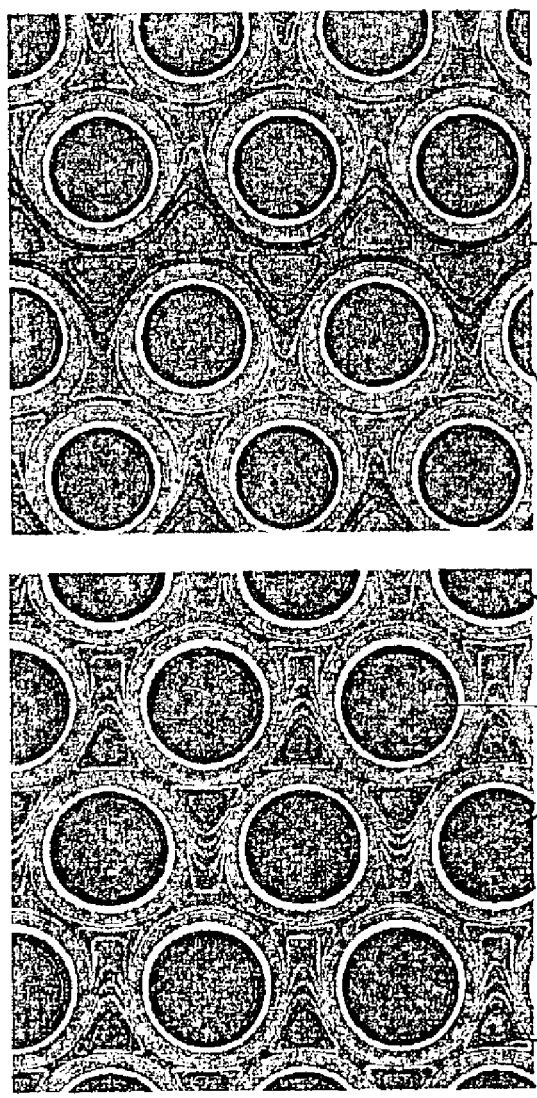
FIGS. 4A and 4B represent charge density, top (x=1, FIG. 4A) and bottom (x=0, FIG. 4B), of a $Li_xNiO_2$ crystal structure.

A quantum mechanical approach has been used to support the statements just made. FIG. 4A depicts the charge density (i.e. chemical bonding of the structure) in the oxygen layer of a LiNiO$_2$ crystal, while in FIG. 4B the charge density of a nickel oxide crystal is presented when all Li ions are removed from the structure.

Figure 5:
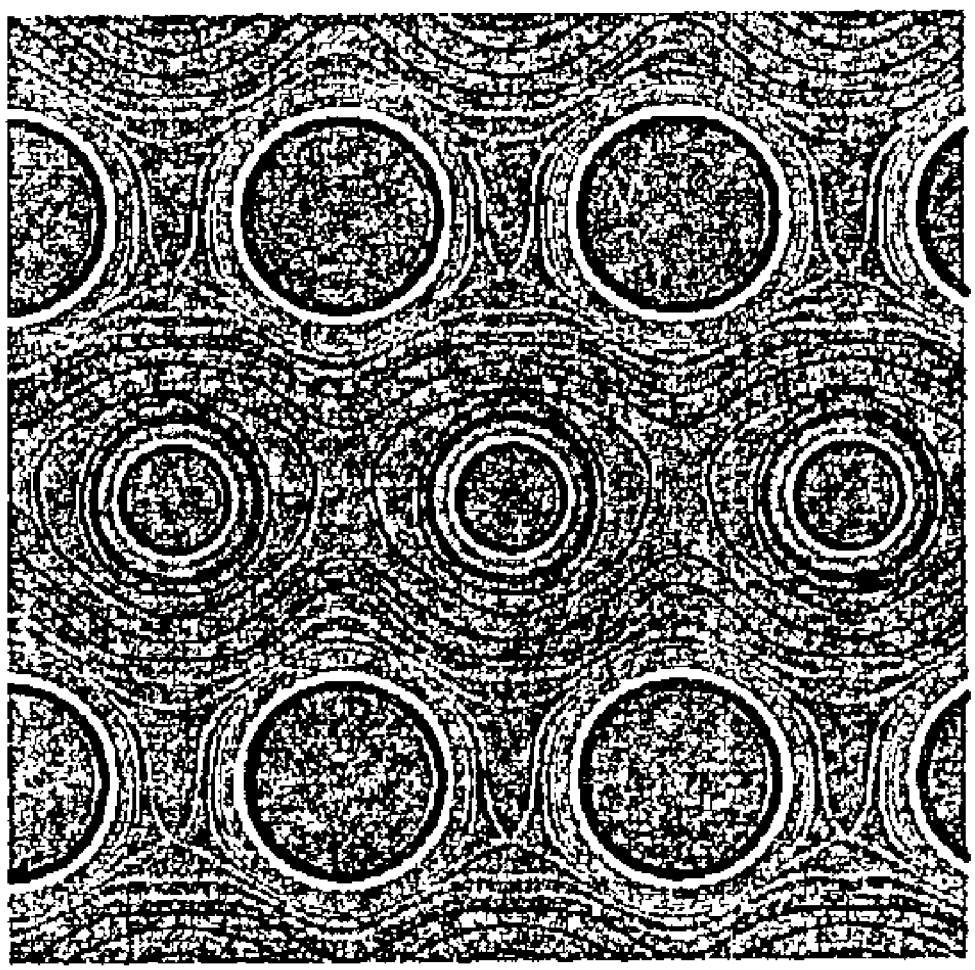
FIG. 5 is a representation of charge density in the metallic planes of $Li_xNiO_2$ for x=1.
Figure 6:
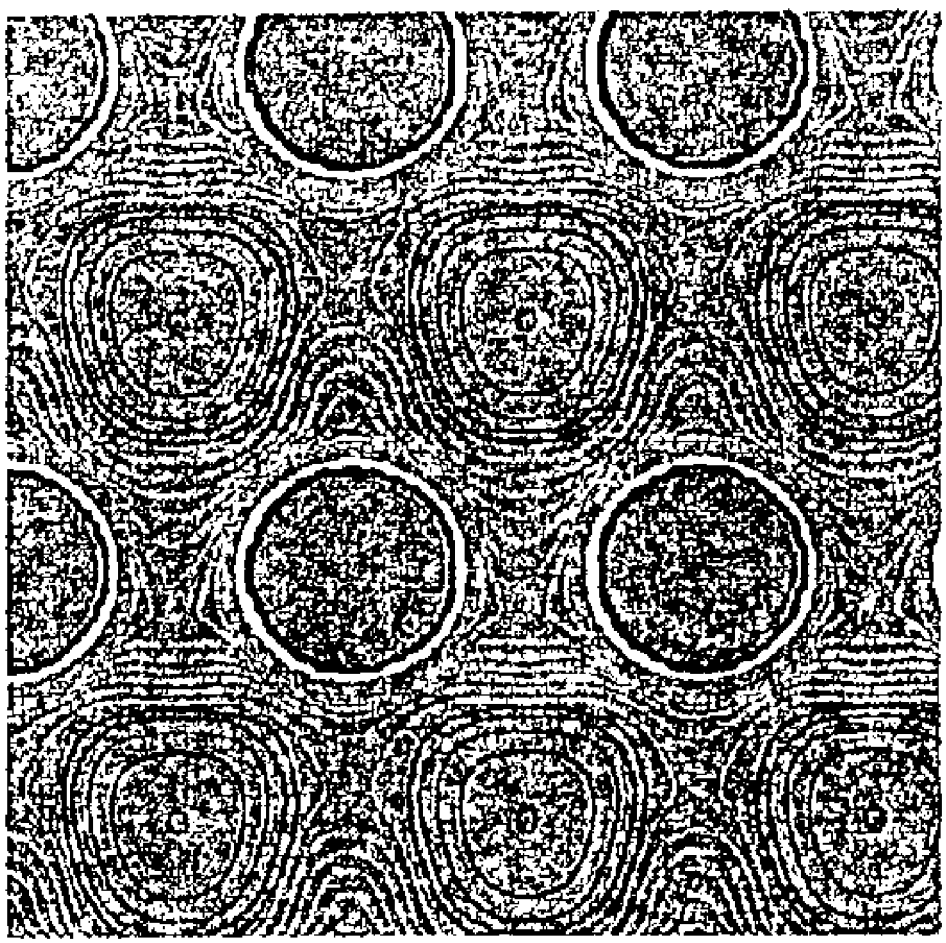
FIG. 6 is a representation of charge density in metallic planes for $Li_xNiO_2$ for x=0.

The charge density of Li$_x$NiO$_2$ in (012) metal planes is presented in FIG. 5 for x=1, and in FIG. 6 for x=0. Top part of FIG. 5 shows rows of Li atoms (smaller circles) and Ni atoms (larger circles). Li atoms do not have any covalent bonding with their nearest neighbors; they are surrounded by very low-density charge regions. This means that Li is fully donating its valence electron to the crystal and ionically interacts with other atoms. On the contrary, Ni atoms create strong covalent bonds in their respective row, as is also is seen in the FIG. 5. For x=1, the Ni—Ni interaction between different rows is negligible, screened completely by Li-ions.

When Li is removed from the structure, as shown in FIG. 6, the picture changes drastically. Ni—Ni bonds are created between the Ni rows in the (012) planes. These metal-metal bonds are responsible for Ni disorder. Therefore, a certain amount of "shielding" atoms has to be preserved in the structure to limit the process of creation of such bonds on the level above which the structural collapse occurs. This is the reason for introducing other atoms than Li (A atoms) in the novel compounds. These atoms stabilize the crystal, as they are normally not removed during cycling.

Shielding is achieved through doping of Li sites by "less mobile" ions, possibly with larger ionic radii.

Figure 7:
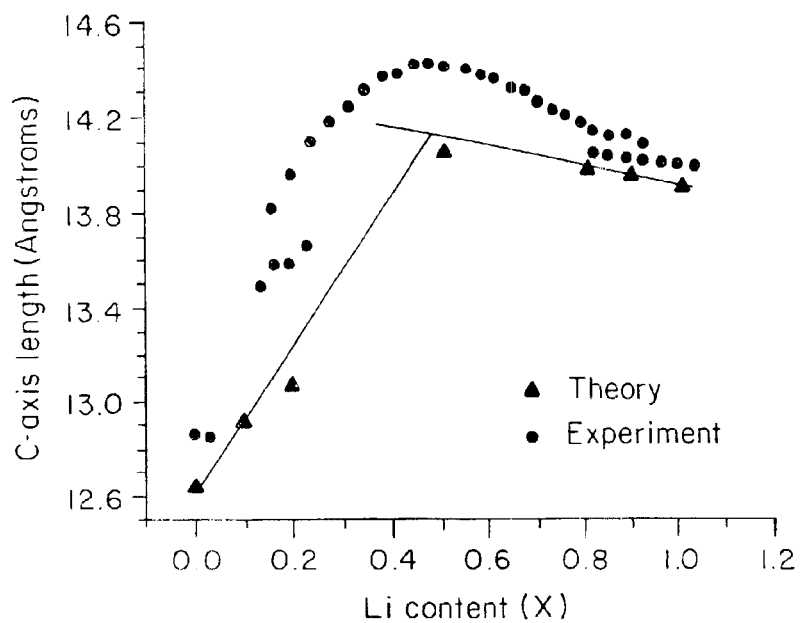
FIG. 7 is a plot of c-axis length versus lithium content (x) in $LiCoO_x$ as determined theoretically, and as identified by experiment.
Figure 8:
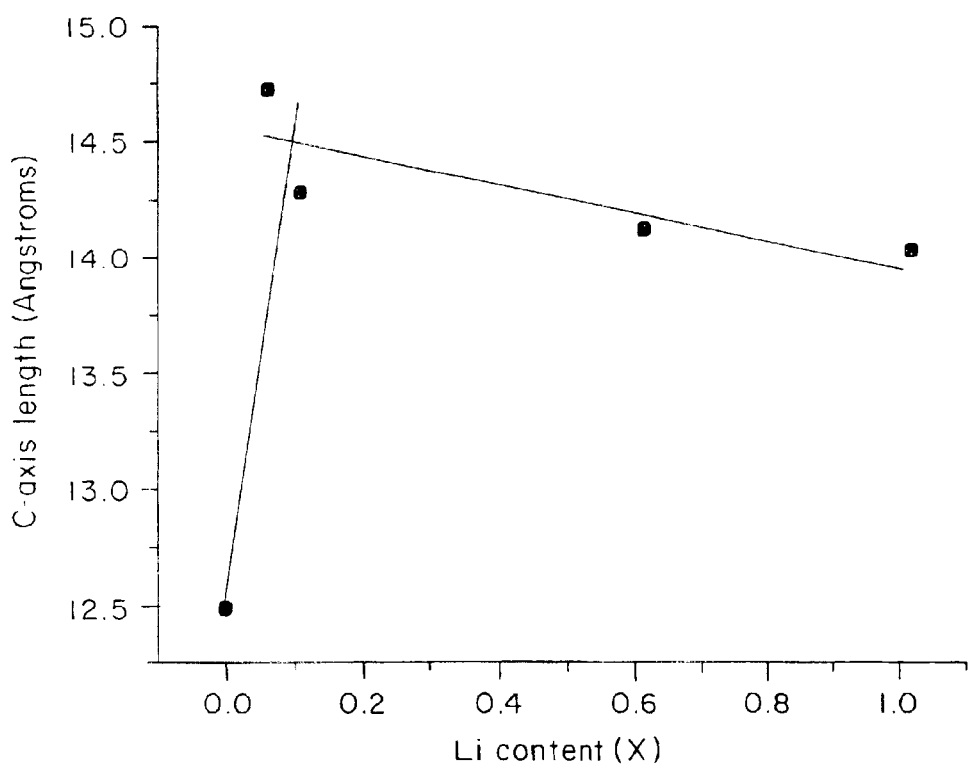
FIG. 8 is a plot of c-axis length versus lithium content (x) in $LiNiO_2$ as theoretically predicted.

The change in the c-axis length upon Li deintercalation has been modeled. The results for Li$_x$CoO$_2$ are presented in FIG. 7. A drastic change in the slope of the c(x) function takes place at around x=0.5, which coincides with the maximum degree of Li deintercalation from LiCoO$_2$. It is believed that this change shows the limit for stability in the crystal structure and determines the maximum capacity of a cathode material. In other words, the slope of the c(x) function in the low-x region is an indicator of relative capacity of a material, i.e. when this slope is larger, the "critical point" in x moves towards lower x values, indicating greater stability of a material. The c-axis change for LiNiO$_2$ also was modeled, and is shown in FIG. 8. The change in the slope of c(x) for LiNiO$_2$ takes place at much lower values of x, indicating increased capacity due to the increased structural stability of LiNiO$_2$ as compared to LiCoO$_2$. The underlying physics behind this behavior is believed to be based on the fact that Ni has one electron more than Co. This additional electron occupies so-called antibonding states, which counteract the tendency to collapse the structure by Ni—Ni bonds, shown in FIG. 5. This feature is used as a rationale for doping with Q atoms. It is believed that doping of Q atoms into Ni sites lowers the number of electrons that are occupying antibonding orbitals, thereby improving safety due to the dilution of Ni atoms. However, due to the compromised capacity, "A" atoms are used to further stabilize the structure, thereby allowing relatively high capacity while maintaining safety. Further, due to the increased structural stability, cyclability typically is high.

Figure 9:
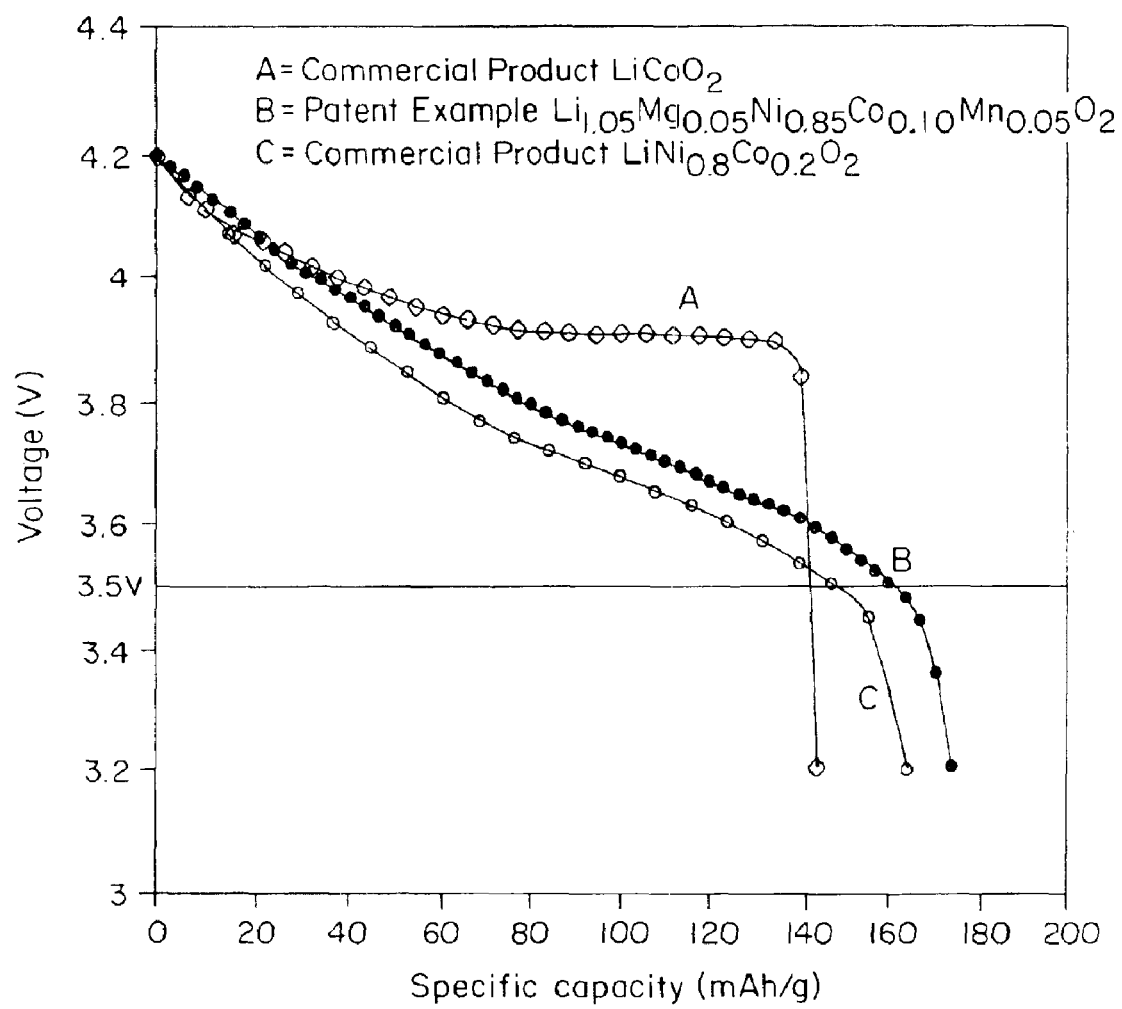
FIG. 9 is a plot of voltage (V) versus specific capacity (mAh/g), identified as polarization curves of three materials: $LiCoO_2$, $LiNi_{0.8}Co_{0.2}O_2$ and $Li_{1.05}Mg_{0.5}Ni_{0.85}Co_{0.1}Mn_{0.05}O_2$.

During discharge, polarization of an active cathode material is especially important. For instance, in cellular telephones, traditionally electronics has stopped working at voltages below 3.5V. For this application it is important that as much capacity as possible is available above this limit. FIG. 9 shows a polarization comparison between $LiCoO_2$ and $LiNi_{0.8}Co_{0.2}O_2$ oxide materials. As can be seen from FIG. 9, the total capacity of the $LiNi_{0.8}Co_{0.2}O_2$ material is higher if the cell is allowed to discharge below 3.5V. However, if 3.5V is the cut-off voltage during discharge, $LiCoO_2$ would have a relatively better capacity. This feature also is addressed in the current invention. We have found certain dopants to increase voltage during discharge. Elements that will positively influence the voltage profile when doped on the 3b site (Q atoms) are among the preferred elements. Element that increase polarization compared to pure $LiNiO_2$ oxide when substituted on the 3b site are manganese, boron, aluminum, gallium and cobalt. Manganese exhibits a particularly good effect on safety properties, while high capacity can be maintained for low substitution levels.

The invention now will be further and specifically described by the following examples, which are not intended to be limiting. All parts and percentages are by weight unless specified otherwise.

EXEMPLIFICATION

A gradient coated material can be prepared by employing $LiNO_3$ (Alfa Aesar crystalline aggregates) and $Co(NO_3)_2 \cdot 6H_2O$ (Alfa Aesar Crystalline) used in stoichiometric amounts to produce a coated precursor material. So far, the base materials (the core) have been a commercially available nickel based material and material synthesized at Arthur D. Little, Inc. Laboratories. Commercial materials are available from, for instance, FMC or Nippon Chemical (Japan). The Li and Co precursors are dissolved in distilled water and mixed with powdered base material. The water then is evaporated off on a hot plate while stirring during a time period of 4 hours. The precursor-coated material then is sintered in air using a Degussa-Ney muffle furnace (model 3-550 or 3-1750) under the following profile: 450° C. for 1 hour 5° C./minute, 700–800° C. for 2 hours 2° C./minute. This allows a concentration gradient structure to form that has more cobalt at the surface than at the core. The invention is not limited to this particular synthesis method, but it is preferred that the core material is coated by a non-reacted precursor from lithium and cobalt precursors in a molten or dissolved state.

All samples are cooled to room temperature by shutting off the furnace and allowing natural cooling. The furnace, therefore, is programmed to shut off after the profile above has been executed. The sintered product is ground for 5 minutes in a Retsch/Brinkmann mortar grinder (model RM100) fitted with an agate mortar and pestle. The particle size distribution ranges between 1–50 μm after grinding.

Materials purity, lattice constants and peak asymmetry are measured by using a Shimadzu 6000 X-ray powder diffractometer, supplied by Kratus Analytical.

Example 1

Synthesis of 10% (mol/mol) $LiCoO_2$ Gradient Having a $LiNi_{0.8}Co_{0.2}O_2$ Core.

Figure 10:
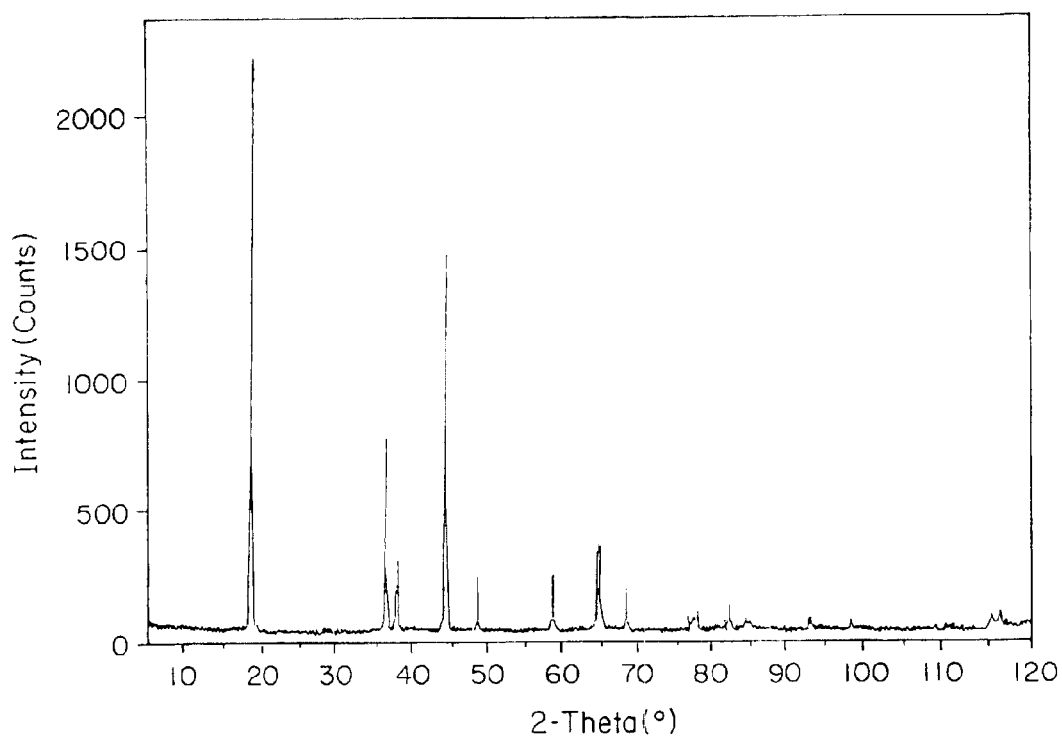
FIG. 10 is an x-ray powder diffraction pattern of a gradient material of the invention described in Example 1.
Figure 11:
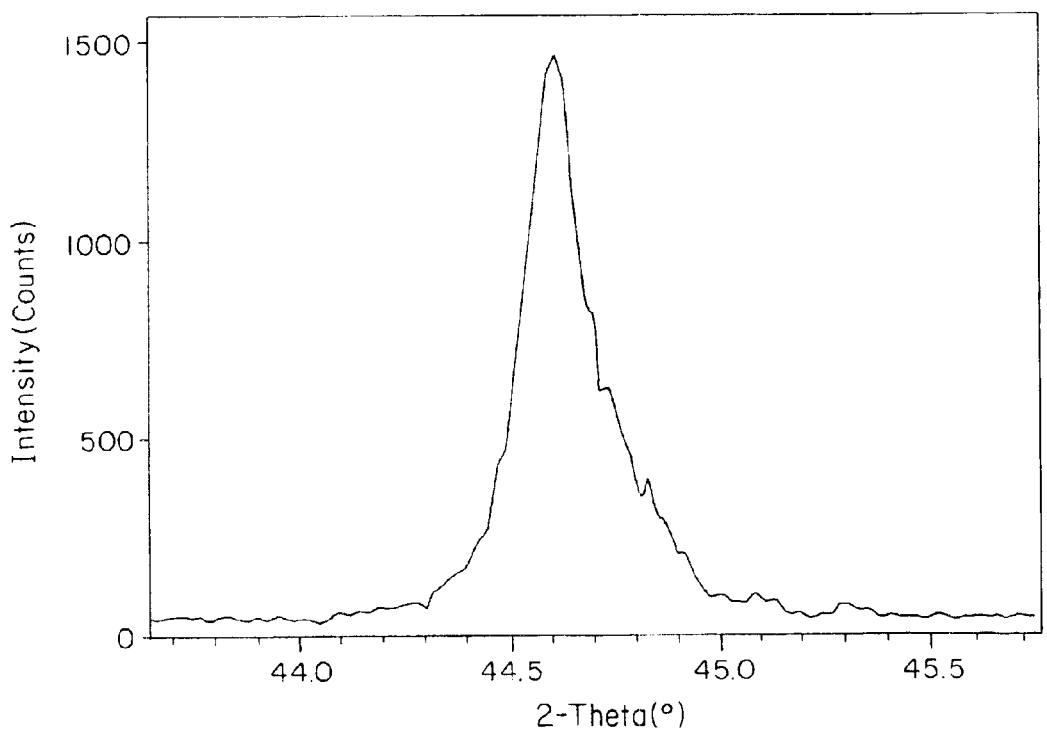
FIG. 11 is an x-ray powder diffraction pattern of the gradient material having an asymmetry peak of Example 1.

7.06 g $LiNO_3$ and 29.69 g $Co(NO_3)_2 \cdot 6H_2O$ were dissolved in 150 ml distilled $H_2O$ to which 100 g N-82 ($LiNi_{0.6}Co_{0.2}O_2$) was added. The $H_2O$ was evaporated off on a hot plate during stirring. The obtained dried cake was ground for 5 minutes in the mortar grinder, placed in an alumina crucible, and sintered under the following heating profile: ramp 5° C./minute to 450° C., hold at 450° C. for 1 hour, ramp 2° C./minute to 750° C., and hold for 1 hour. The sample was then allowed to cool naturally to room temperature and ground for 5 minutes to break up agglomerates. When subjected to the XRD, this material shown to have a gradient profile. No impurities were visible, as can be seen in XRD pattern of FIG. 10. The lattice parameters were a=2.8676(6) A, c=14.168(2) A. Peak asymmetry by XRD was present in the sample FIG. 11.

Electrochemical measurements of this powder yielded a specific capacity of 172 mAh/g with a cycle efficiency of 92%, and a gassing volume of 4.5 cc/g. This shows the material to have improved gassing characteristics and cycle efficiency to comparative Example 2.

Example 2

Synthesis of 2.5% (mol/mol) $LiCoO_2$ Gradient Having a $LiNi_{0.8}Co_{0.2}O_2$ (N-82, Nippon Chemical) Core.

Figure 12:
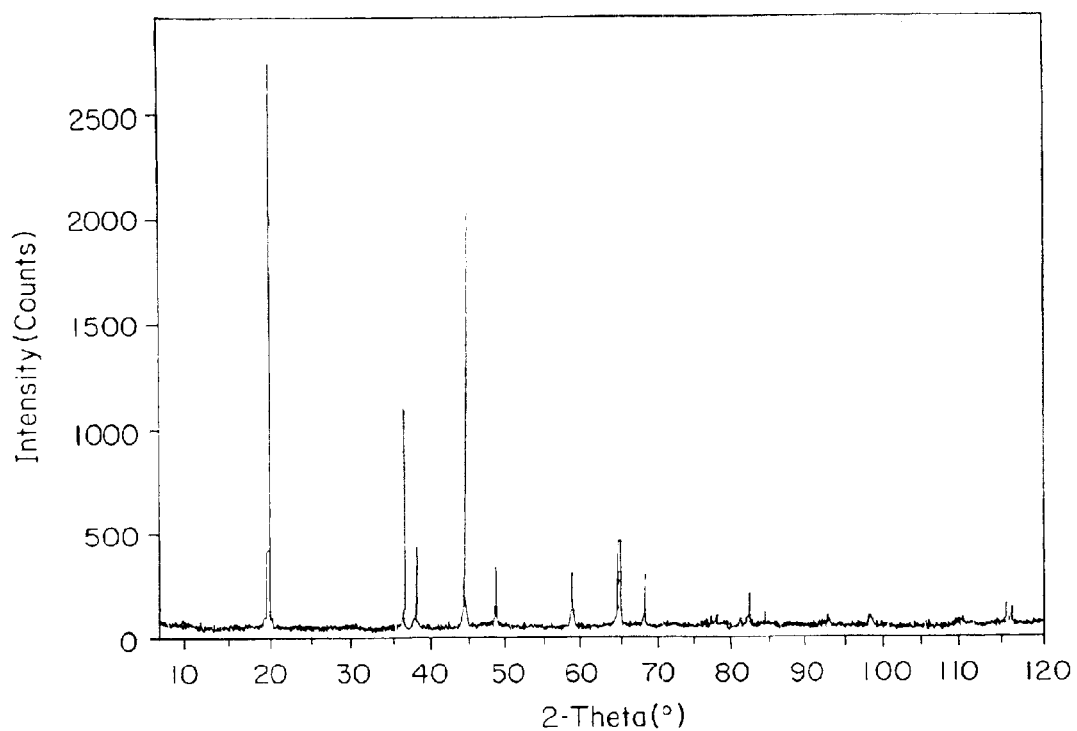
FIG. 12 is an x-ray powder diffraction pattern of a gradient material of the invention described in Example 2.
Figure 13:
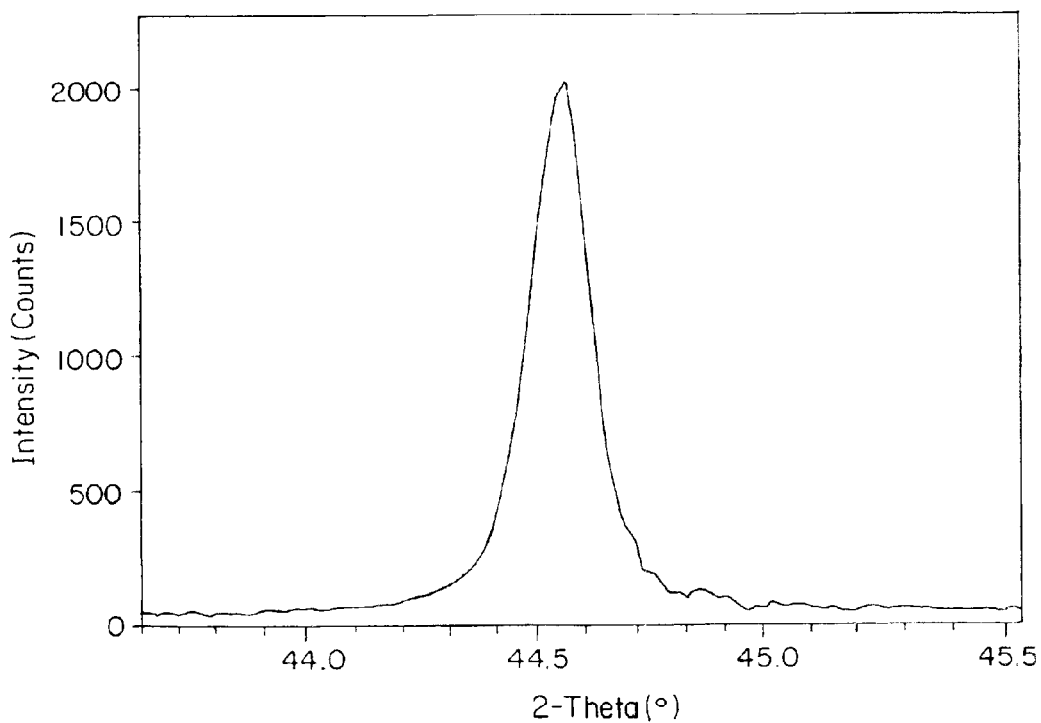
FIG. 13 is an x-ray powder diffraction pattern of an asymmetric peak of the gradient material of Example 2.

1.77 g $LiNO_3$, and 7.42 g $Co(NO_3)_3 \cdot 6H_2O$ were dissolved in 100 ml distilled $H_2O$ to which 100 g N-82 was added. The $H_2O$ was evaporated off on a hot plate during stirring. The obtained dried cake was ground for 5 minutes in the mortar grinder, placed in an alumina crucible, and sintered under the following heating profile: ramp 10° C./minute to 110° C., hold at 110° C. for 20 minutes, ramp 5° C./minute to 450° C., hold at 450° C. for 1 hour, ramp 2° C./minute to 700° C., and hold for 1 hour. The sample then was allowed to cool naturally to room temperature and ground for 5 minutes to break up agglomerates. When subjected to XRD, this material was shown to have a gradient profile. No impurities were visible (FIG. 12). Peak asymmetry by XRD was present in the sample, FIG. 13.

Electrochemical measurements of this powder yielded a specific capacity of 148 mAh/g with a cycle efficiency of 82%, and a gassing volume of 1.8 cc/g. This shows the material to have improved gassing characteristics when compared to comparative Example 2.

Example 3

Synthesis of 10% (mol/mol) $LiCoO_2$ Gradient Having a $Li_{1.1}Ni_{0.87}Co_{0.1}B_{0.03}O_2$ (Arthur D. Little Material (ADL)) Core.

Figure 14:
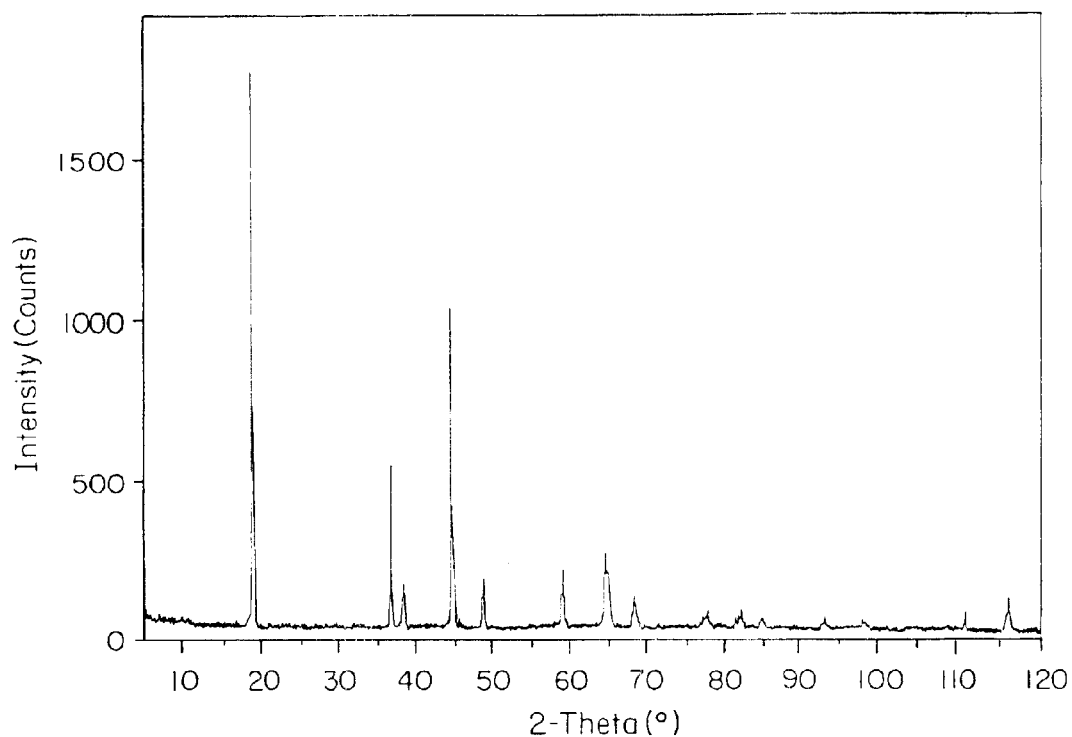
FIG. 14 is an x-ray powder diffraction pattern of a gradient material of the invention described in Example 3.
Figure 15:
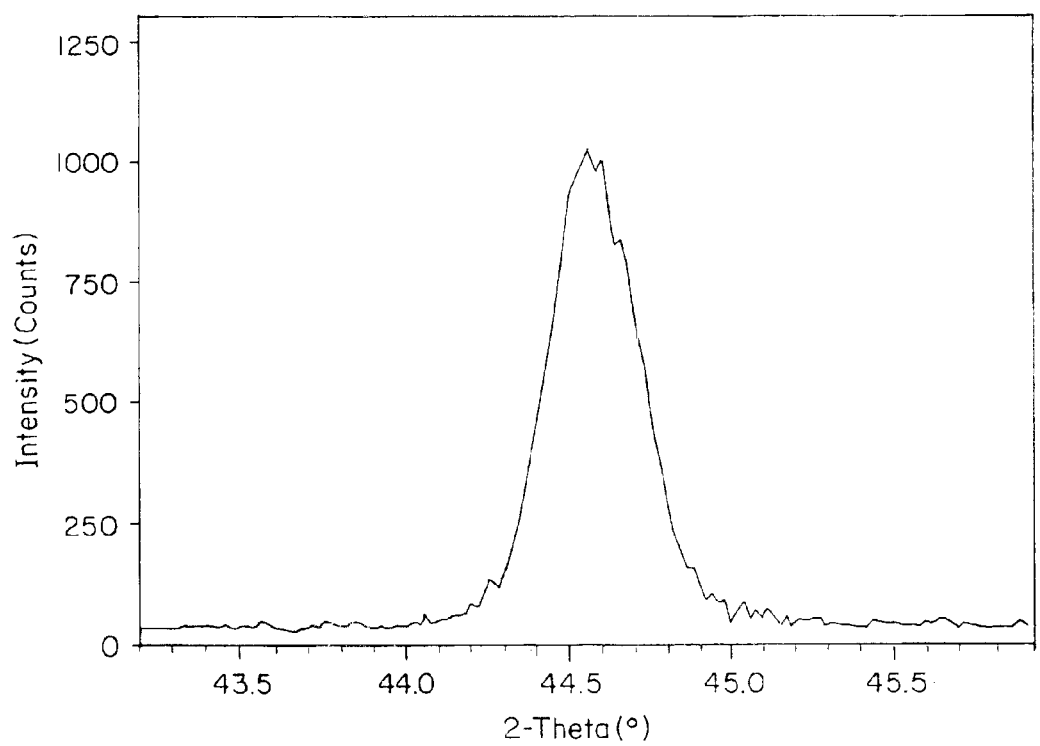
FIG. 15 is an x-ray powder diffraction pattern of an asymmetric peak of the gradient material described in Example 3.

7.11 g $LiNO_3$ and 29.98 g $Co(NO_3)_3 \cdot 6H_2O$ were dissolved in 150 ml distilled $H_2O$ to which 100 g $Li_{1.1}Ni_{0.87}Co_{0.1}B_{0.03}O_2$ (ADL) was added. The $H_2O$ was evaporated off on a hot plate during stirring. The obtained dried cake was ground for 5 minutes in the mortar grinder, placed in an alumina crucible, and sintered under the following heating profile: ramp 5° C./minute to 450° C., hold at 450° C. for 1 hour, ramp 2° C./minute to 750° C., and hold for 1 hour. The sample then was allowed to cool naturally to room temperature and ground for 5 minutes to break up agglomerates. When subjected to XRD this material was shown to have a gradient profile. No impurities were visible (FIG. 14). The lattice parameters were a=2.873(2), b=c=14.167(5), and slight peak asymmetry by XRD was present in the sample, FIG. 15.

Electrochemical measurements of this powder yielded a specific capacity of 181 mAh/g with a cycle efficiency of about 91%, and a gassing volume of 6.0 cc/g when cycled between 4.2V and 3.0V. This shows the material to have improved gassing and cycle efficiency characteristics to comparative Example 4.

Example 4
Example for Electrode Fabrication and Electrochemical Measurement 37.6 grams metal oxide powder (active engineered gradient material and N-82, $LiCoO_2$ comparisons), 1.2 gram Chevron C-100 carbon black (conductive additive), and 18 grams NMP were added in a 250 ml jar with 50 steel balls (φ=¼ inch). The mixture was mixed by paint shaking for 30 min. 10 g PVDF binder solution (Kureha Chemical LFD 2777, 12 wt % PVDF solution) was added. The mixture was further mixed for 10 minutes.

The slurry was applied on an Al foil (thickness ~20 μm) using a doctor blade with a wet coating thickness 10 mil. The coated electrode was heated at 130° C. for 30 min. The typical thickness of the electrode with Al current collector was 100 μm.

The electrode was cut in 2 cm² disc. The disc was pressed at room temperature with an apparent pressure of 500 kg/cm². The typical thickness of the electrode with the current collector after pressing was 80 μm, and the typical active material weight in the disc electrode was 20 mg. The electrode was dried at 80° C. under vacuum for 16 hours before cell assembly.

A 2-electrode coin cell was fabricated using lithium foil (Aldrich) as counter and the dried electrode as working electrode, glass fiber as separator, and EC/DMC (1:1)-$LiPF_6$ 1M (EM Industries) as electrolyte. All operations were carried in an Ar filled glove box with water and oxygen level less than 1 ppm.

The coin cell was cycled using Maccor Systems cycler using charge currents (de-intercalation) to 4.30V and then constant charge voltage (at 4.30V) to a current less than 50 μA/cm². Discharge used C/20 and C/5 discharge currents to a voltage 3.0V.

Example 5
Example for Gassing Measurements
a) Cell Fabrication

Coated cathodes with formulation of active material/carbon black/PVDF=94/3/3 (wt %) are cut into 60×50 mm² size. The electrode was pressed at room temperature with a pressure of 500 kg/cm². Typical thickness of the electrode with the current collector after pressing was 80 μm, and the typical active material weight in the disc electrode was 15 mg/cm². The electrode was dried at 80° C. under a vacuum for 16 hours before cell assembly. Similar to the cathode, an anode with formulation of MCMB/PVDF=93/7 (wt %) was cut into 60×50 mm². The electrode was pressed at room temperature with an apparent pressure of 500 kg/cm² and dried at 80° C. under vacuum for 16 hours before cell assembly. The typical anode active material weight in the disc electrode was 10 mg/cm².

The anode and cathode were separated by a glass fiber separator with a rectangular size of 65×55 mm². The EC/DMC (1:1)-$LiPF_6$ 1M (EM Industries) electrolyte was absorbed in the electrodes and separator. The electrodes and separator were compressed between two 70×60 mm² glass plates. The whole assembly was put into an Al laminated bag (size approximate 80×70 mm²), which was sealed under vacuum. All operations were carried in an Ar filled glove box with water and oxygen level less than 1 ppm.

b) Electrochemical Charging

After measuring the volume of the cell, binder clips clamped the cell to eliminate electrode shifting in the event of gassing. After rest for 2 hours, it was charged and discharged using C/10 current between 4.2–2.7V once. The cell then was charged to 4.5V with C/10 current, and held at 4.5V for 4 hours in an oven set at 60° C. The cell then was removed from the oven and allowed to cool to room temperature before volume measurements were made of the cell assembly.

c) Volume Measurements

The volume of the cell before and after charging was measured by immersing the cell in water. The volume is equal to the volume of the displaced water. The volume of gas generated during charging was measured as the volume difference before and after charging. The gas volume then was normalized by the weight of active cathode material.

Comparative Example 1

Figure 16:
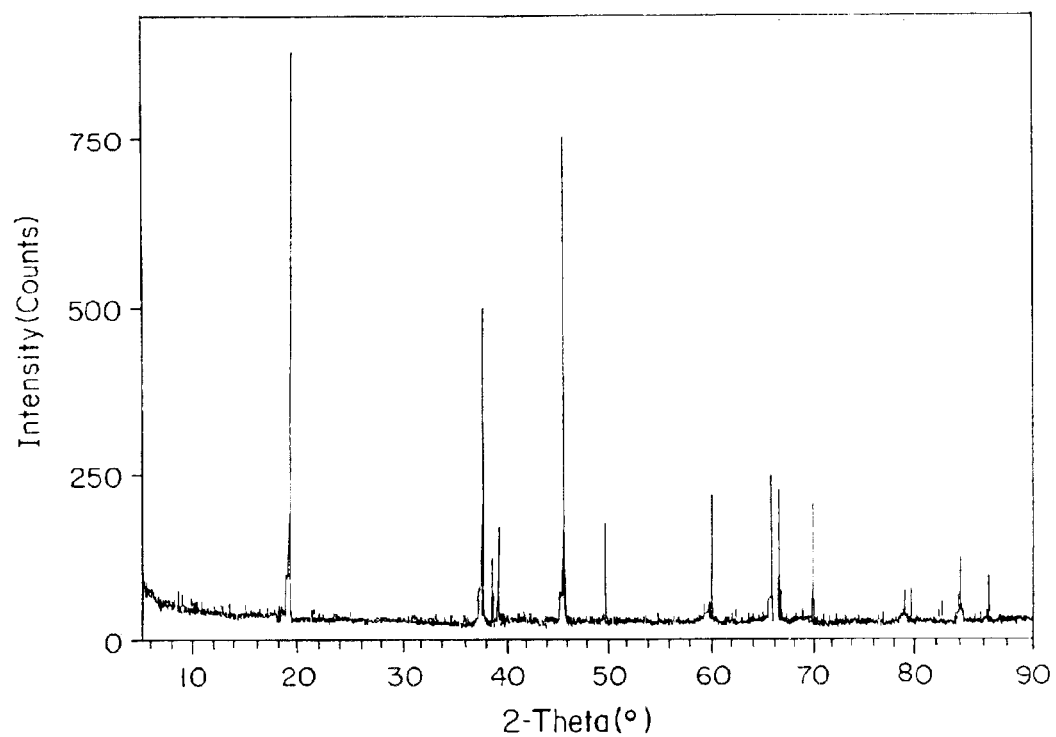
FIG. 16 is an x-ray powder diffraction pattern of a cathode material described in comparative Example 1.

A $LiCoO_2$ was purchased from Nippon Chemical and subjected to XRD, electrochemical and gassing tests. The powder was found to be phase pure by XRD (FIG. 16). No XRD peak asymmetry was detected. This shows that the $LiCoO_2$ material does not have a gradient coating. Electrochemical measurements of this powder yielded a specific capacity of 142 mAh/g with a cycle efficiency of 95%. This shows that this material has relatively low capacity compared to the invention examples.

Comparative Example 2

Figure 17:
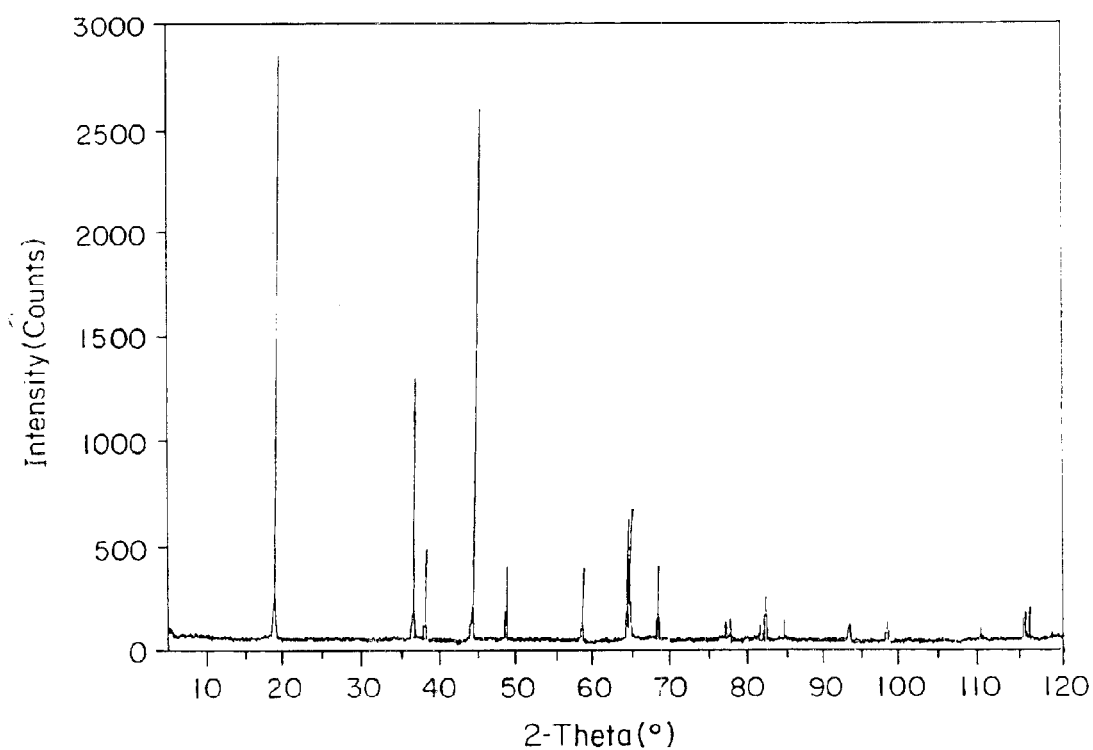
FIG. 17 is an x-ray powder diffraction pattern of a cathode material described in comparative Example 2.

A $LiNi_{0.8}Cu_{0.2}O_2$ material (N-82) was purchased from Nippon Chemical and subjected to XRD (FIG. 17), electrochemical and gassing tests. The powder was found to be phase pure by XRD with lattice parameters of a=2.8679(2)Å and c=14.699(7)Å. No peak asymmetry was detected. This shows that the nickel-based material does not have a gradient coating. Electrochemical measurements of this powder yielded a specific capacity of 165 mAh/g with a cycle efficiency of 85%, and a gassing volume of 8.6 cc/g. This shows that this material has high gassing properties, compared to Example 1.

Comparative Example 3

Figure 18:
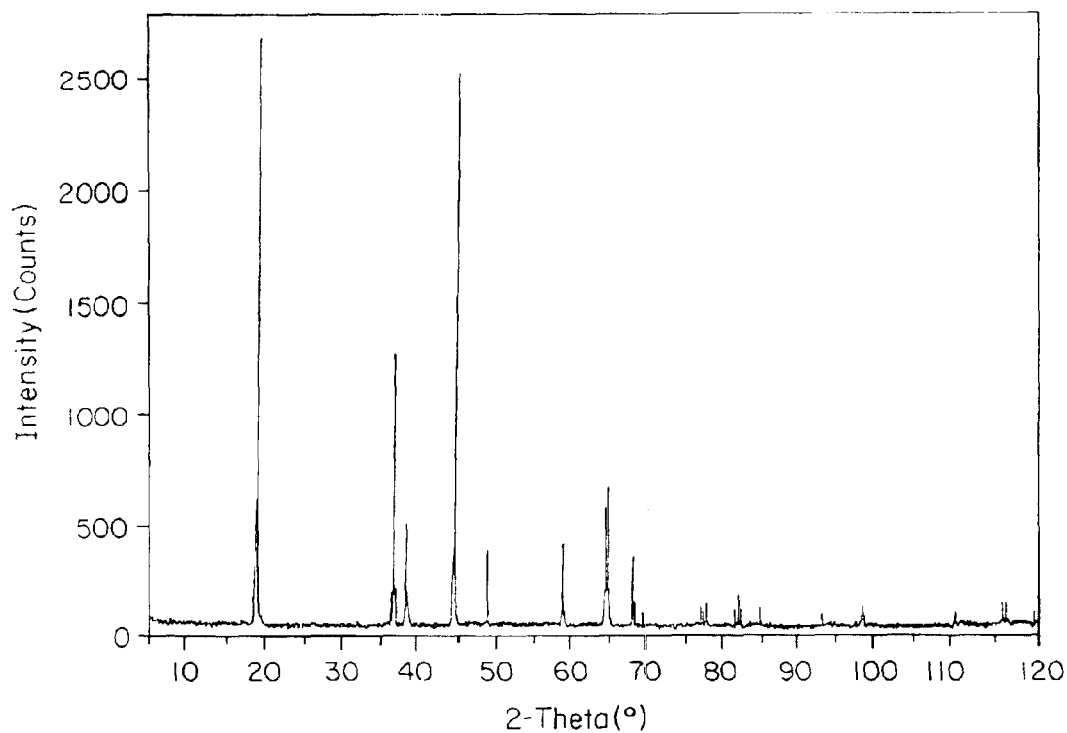
FIG. 18 is an x-ray powder diffraction pattern of a powder that includes a mixed cathode material from comparative Example 3, wherein peaks from $LiCoO_2$ peaks from $LiNi_{0.8}Co_{0.2}O_2$ are identified.

The two materials in Comparative Examples 1 and 2 were mixed together in a 10/90 ratio (mol %/mol %) and subjected to XRD (FIG. 18). The powder was found to have distinct peaks from the two compounds. This shows that asymmetry can not be obtained just by having two components, which would be the case for a $LiCoO_2$ coated material where $LiCoO_2$ is coated as a separate phase onto the core compound.

Comparative Example 4

Figure 19:
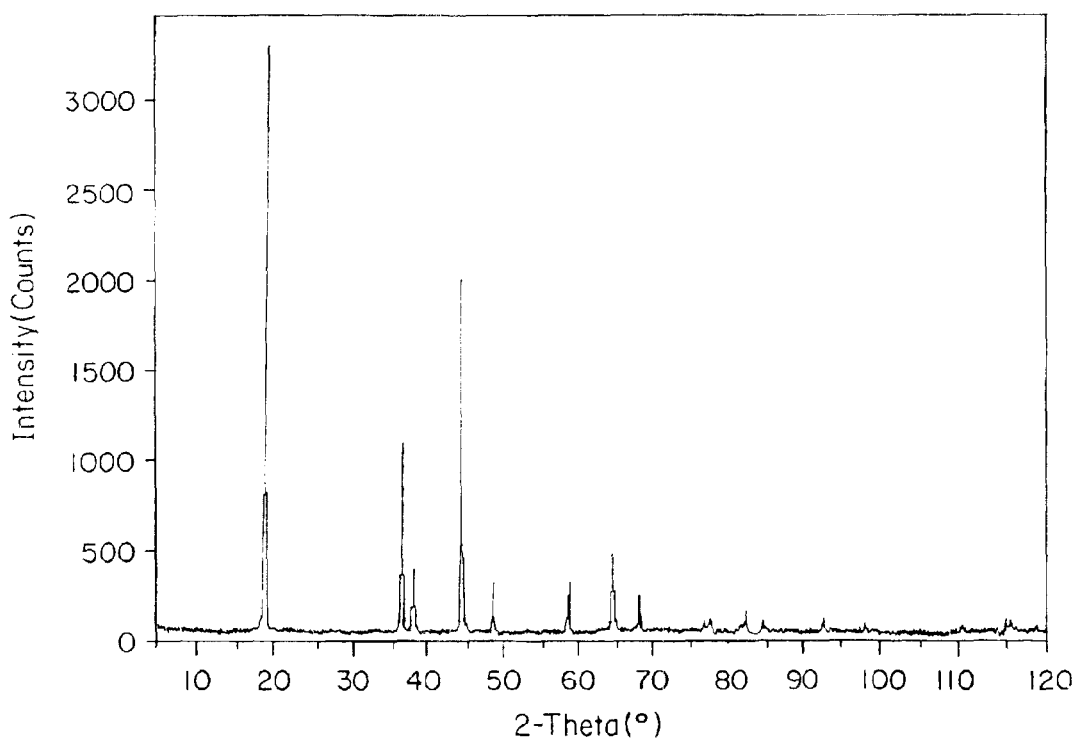
FIG. 19 is an x-ray powder diffraction pattern of a material described in comparative Example 4.

Synthesis of $Li_{1.1}Ni_{0.87}Co_{0.1}B_{0.03}O_2$ 19.56 g $LiNO_3$, 20.81 g $Ni(OH)_2$, 2.40 g $Co(OH)_2$ and 0.27 g $B_2O_3$ were placed in a Retsch/Brinkmann mortar grinder (model RM100) fitted with agate mortar and pestle and ground for 5 minutes. The resultant homogeneous powder was placed in an alumina combustion tray, and sintered in a Degussa-Ney muffle furnace (model 3-1750), under the following profile: ramp 5° C./minute to 450° C., hold at 450° C. for 4 hours, ramp 2° C./minute to 750° C., hold at 750° C. for 4 hours. The sample was allowed to cool naturally to room temperature and then ground 5 minutes in the mortar grinder to attain a particle size range of 1–50 μm. When subjected to XRD this material was shown to have no gradient profile. No impurities were visible (FIG. 19). The lattice parameters were a=2.8743(5), c=14.183(2). Electrochemical measurements of this powder yielded a specific capacity of 174 mAh/g with a cycle efficiency of 85%, and a gassing volume of 18.0 cc/g. This shows that this material has bad gassing properties, but an acceptably high capacity compared to Example 3.

Example 6
Synthesis of $LiMg_{0.01}Ni_{0.87}Co_{0.08}Mn_{0.05}O_2$ Base Material 73.83 g $LiNO_3$ (excess Lithium was used), 0.59 g $Mg(OH)_2$, 29.69 g $Co(OH)_2$, and 5.86 g $MnCO_3$ were mixed 5 minutes in a Retsch/Brinkmann mortar grinder (model RM100) fitted with an agate mortar and pestle. The mixed materials were added to a 1 L high density polyethylene jar containing 82.25 g $Ni(OH)_2$ and mixed by shaking. The homogeneous precursor powders are placed in an alumina crucible, and sintered under air using the following heating profile: ramp 5° C./minute to 450° C., hold at 450° C. for 4 hours, ramp 2° C./minute to 775° C., and hold for 24 hours. The sample was then allowed to cool naturally to room temperature and ground for 5 minutes to break up agglomerates. When subjected to XRD this material was shown to be the phase pure rhombohedral structure of type a-$NaFeO_2$ with no detectable impurities.

Example 7
Synthesis of 1% (mol/mol) $LiCoO_2$ Gradient Having a $LiMg_{0.01}Ni_{0.87}Co_{0.08}Mn_{0.05}O_2$ Base.

0.706 g $LiNO_3$, and 2.97 g $Co((NO)_3)_2 \cdot 6H_2O$ were dissolved in 150 ml distilled $H_2O$ to which 100 g base material (described above Example 6) was added. The $H_2O$ was evaporated off on a hot plate during stirring. The obtained dried cake was ground for 5 minutes in the mortar grinder, placed in an alumina crucible, and sintered under air using the following heating profile: ramp 5° C./minute to 450° C., hold at 450° C. for 1 hour, ramp 2° C./minute to 750° C., and hold for 2 hour. The sample was then allowed to cool naturally to room temperature and ground for 5 minutes to break up agglomerates. When subjected to XRD this material was shown to have a gradient profile. No other phase was visible by means of XRD.

Example 8
Synthesis of 2.5% (mol/mol) $LiCoO_2$ Gradient Having a $LiMg_{0.01}Ni_{0.87}Co_{0.08}Mn_{0.05}O_2$ Base.

The experimental procedure was similar to the procedure describe in Example 7, but 1.76 g $LiNO_3$, and 7.42 g $Co((NO)_3)_2 \cdot 6H_2O$ were dissolved in 150 ml distilled $H_2O$. When subjected to XRD this material was shown to have a gradient profile. No other phase was visible by means of XRD.

Example 9
Synthesis of 5% (mol/mol) $LiCoO_2$ Gradient Having a $LiMg_{0.01}Ni_{0.87}Co_{0.08}Mn_{0.05}O_2$ Base.

The experimental procedure was similar to the procedure describe in Example 7, but 3.53 g $LiNO_3$, and 14.85 g $Co((NO)_3)_2 \cdot 6H_2O$ were dissolved in 150 ml distilled $H_2O$. When subjected to XRD this material was shown to have a gradient profile. No other phase was visible by means of XRD.

Example 10
Synthesis of 10% (mol/mol) $LiCoO_2$ Gradient Having a $LiMg_{0.01}Ni_{0.87}Co_{0.08}Mn_{0.05}O_2$ Base.

The experimental procedure was similar to the procedure describe in Example 7, but 7.06 g $LiNO_3$, and 29.69 g $Co((NO)_3)_2 \cdot 6H_2O$ were dissolved in 150 ml distilled $H_2O$. When subjected to XRD this material was shown to have a gradient profile. No other phase was visible by means of XRD.

Example 11
Synthesis of 10% (mol/mol) $LiCoO_2$ Gradient Having a $LiMg_{0.01}Ni_{0.87}Co_{0.08}Mn_{0.05}O_2$ Base.

The experimental procedure was similar to the procedure describe in Example 10, but an upper heating temperature of 800° C. was used instead of 750° C.

Example 12
Synthesis of $LiMg_{0.03}Ni_{0.87}Co_{0.10}Mn_{0.03}O_2$—Base Material 74.7 g $LiNO_3$ (excess Lithium was used), 1.77 g $Mg(OH)_2$, 8.13 g $Co_3O_4$, and 3.49 g $MnCO_3$ were mixed 5 minutes in a Retsch/Brinkmann mortar grinder (model RM100) fitted with an agate mortar and pestle. The mixed materials were added to a 1 L high density polyethylene jar containing 65.79 g NiO and mixed by shaking. The homogeneously mixed precursor powders are placed in an alumina crucible, and sintered under air using the following heating profile: ramp 5° C./minute to 450° C., hold at 450° C. for 4 hours, ramp 2° C./minute to 850° C., and hold for 6 hours. The sample was then allowed to cool naturally to room temperature and ground for 5 minutes to break up agglomerates. A second calcination procedure, using the same heating profile as the first calcination, was then applied. When subjected to XRD this material was shown to contain the phase pure rhombohedral structure with no other detectable impurities.

Example 13
Synthesis of 5% (mol/mol) $LiCoO_2$ Gradient Having a $LiMg_{0.03}Ni_{0.87}Co_{0.10}Mn_{0.03}O_2$ Base.

The experimental procedure was similar to the procedure describe in Example 7, but 3.53 g $LiNO_3$, and 14.85 g $Co((NO)_3)_2 \cdot 6H_2O$ were dissolved in 150 ml distilled $H_2O$, and an upper temperature of 800° C. was used instead of 750° C. When subjected to XRD this material was shown to have a gradient profile. No other phase was visible by means of XRD. Base material used was from Example 12.

Example 14
Synthesis of 10% (mol/mol) $LiCoO_2$ Gradient Having a $LiMg_{0.03}Ni_{0.87}Co_{0.10}Mn_{0.03}O_2$ Base.

The experimental procedure was similar to the procedure describe in Example 13, but 7.06 g $LiNO_3$, and 29.69 g $Co((NO)_3)_2 \cdot 6H_2O$ were dissolved in 150 ml distilled $H_2O$. When subjected to XRD this material was shown to have a gradient profile. No other phase was visible by means of XRD.

Example 15
Synthesis of $LiNi_{0.90}Co_{0.05}Mn_{0.05}O_2$ Base Material 77.27 g $LiNO_3$ (excess Lithium was used), 4.74 g $Co(OH)_2$, and 5.86 g $MnCO_3$ were mixed 5 minutes in a Retsch/Brinkmann mortar grinder (model RM100) fitted with an agate mortar and pestle. The mixed materials were added to a 1 L high density polyethylene jar containing 85.02 g $Ni(OH)_2$ and mixed by shaking. The homogeneous precursor powders are placed in an alumina crucible, and sintered under air using the following heating profile: ramp 5° C./minute to 450° C., hold at 450° C. for 4 hours, ramp 2° C./minute to 775° C., and hold for 24 hours. The sample was then allowed to cool naturally to room temperature and ground for 5 minutes to break up agglomerates. When subjected to XRD this material was shown to be phase pure with no visible impurities.

Example 16
Synthesis of $LiNi_{0.87}Co_{0.1}B_{0.03}O_2$ Base Material 19.56 g $LiNO_3$ (excess Lithium was used), 20.81 g $Ni(OH)_2$, 2.40 g $Co(OH)_2$ and 0.27 g $B_2O_3$ were placed in a Retsch/Brinkmann mortar grinder (model RM 100) fitted with agate mortar and pestle and ground for 5 minutes. The resultant homogeneous powder was placed in an alumina combustion tray, and sintered in a Degussa-Ney muffle furnace (model 3-1750), under air using the following profile: ramp 5° C./minute to 450° C., hold at 450° C. for 4 hours, ramp 2° C./minute to 750° C., hold at 750° C. for 4 hours. The sample was allowed to cool naturally to room temperature and then ground 5 minutes in the mortar grinder to attain a particle size range of 1–50 µm. When subjected to XRD this material was shown to be phase pure with no visible impurities.

Example 17
XRD Analysis

Figure 20:
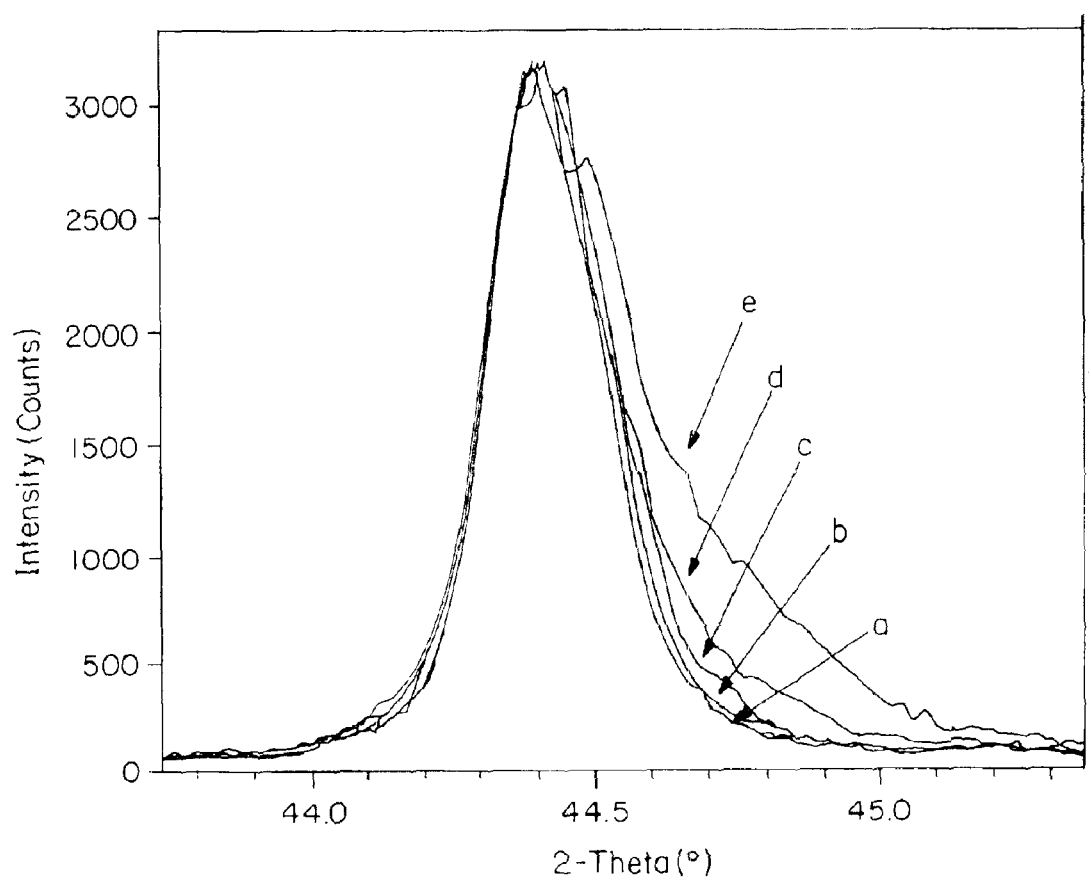
FIG. 20 are x-ray powder diffraction patterns of a Bragg reflection (104) from Example 17.

Powder X-ray diffraction patterns were collected for Example 6, 7, 8, 9, 10, 13, 14 and 15 in a continuous scan between 5 and 120 degrees in 2-theta using an automated Shimadzu XRD-6000 diffractometer. The gradient coating was detected by studying the increasing degree of asymmetry in the Bragg reflections. In particular the (104) peak at about 44.4 degrees in 2-theta was used, FIG. 20. FIG. 20 shows how the asymmetry of (104) is continuously increased with the amount $LiCoO_2$ used. The respective XRD patterns in FIG. 20 have been adjusted for 2-theta zero point position and normalized in intensity in order to easily compare the patterns. a=Example 6 (Base Compound), b=Example 7 (1% $LiCoO_2$), c=Example 8 (2.5% $LiCoO_2$), d=Example 9 (5% $LiCoO_2$), e=Example 10 (10% $LiCoO_2$).

Example 18
Atom Structure Analysis Using Rietveld Technique

Figure 21:
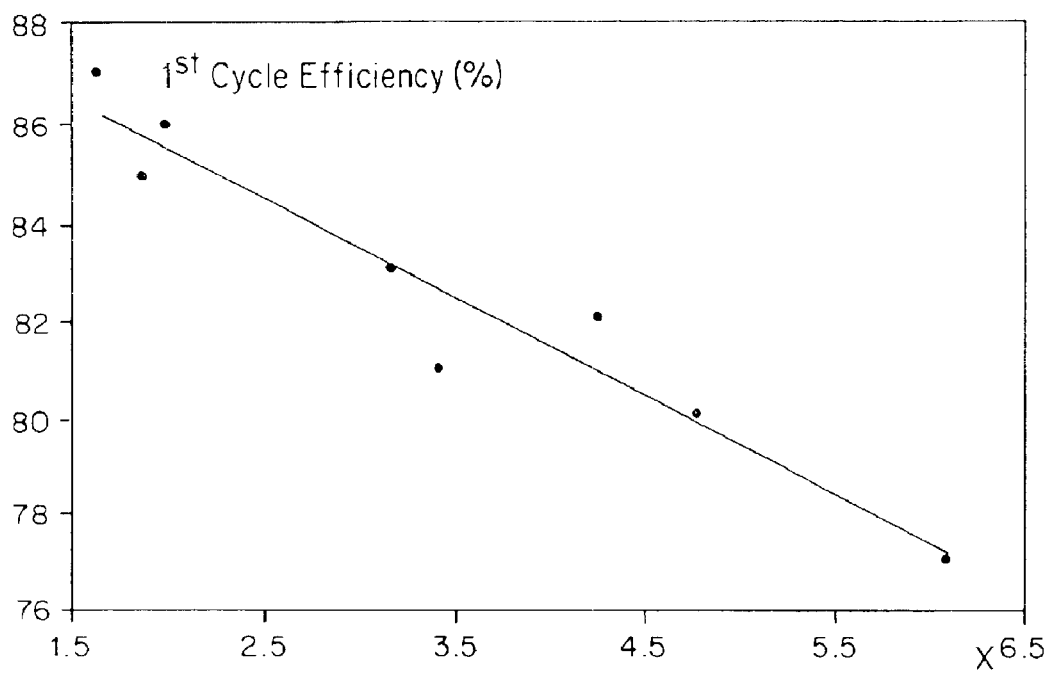
FIG. 21 is a plot of first cycle efficiency versus Ni ion disorder.
Figure 22:
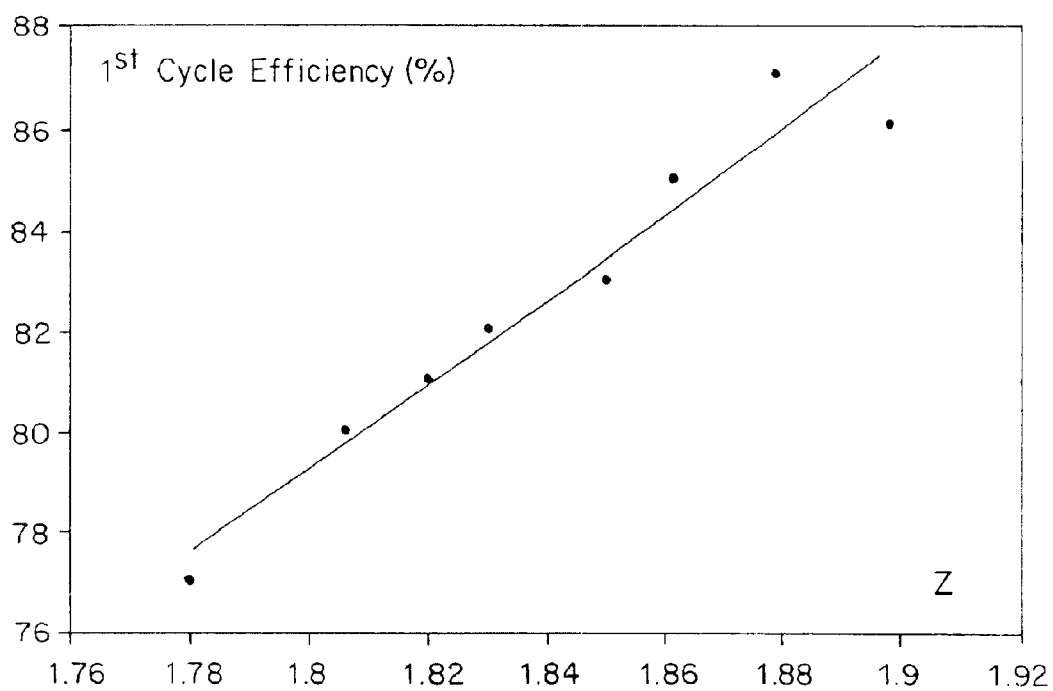
FIG. 22 is a plot of first cycle efficiency versus oxygen stoichiometry.

The X-ray diffractograms from Example 17 were subjected to atom structure analysis using the Rietveld technique as implemented in the Fullprof program (Ref. FullProf—Version 3.5d Oct98-LLB-JRC, Author: Juan Rodriguez-Carvajal, Laboratoire Leon Brillouin (CEA-CNRS), France). Procedures for atom structure refinements are evident to those skilled in the art. Using these refinements the relative amounts of $Ni^{2+}$ ions occupying the Li-site were refined. In addition the relative occupation of oxygen in the oxygen site was refined for each diffractogram obtained from sample patterns in Example 14. The occupation of $Mg^{2+}$-ions in the Li site and Co- and Mn-ions occupying the Ni site were treated as constants, as expressed by the chemical formula $(Li_{1-x}Mg_{0.01}Ni_x)(Ni_{0.87-x}Li_xCo_{0.08}Mn_{0.05})O_2$. Oxygen occupation z was refined as an individual parameter, while the occupation of Li and Ni could vary between the two respective sites, i.e. the Ni occupation was coupled to the Li occupation in one single parameter, x, so that intermixing between sites was allowed. This procedure allows the determination of the amount nickel ions that are disordered into the Li site during synthesis. FIGS. 21 and 22 show that first cycle efficiency is increased as nickel disorder (% $Ni^{2+}$) is decreasing and relative oxygen levels z are increased. This shows that as order/disorder properties are improved efficiency and capacity of the material will increase.

Example 19
Synthesis of 5% (mol/mol) $LiCoO_2$ Gradient Having a $LiNi_{0.90}Co_{0.05}Mn_{0.05}Mn_{0.05}O_2$ Base.

The experimental procedure used was similar to the procedure of Example 9, but the base material used was $LiNNi_{0.90}Co_{0.05}Mn_{0.05}O_2$ from Example 15.

Example 20
Synthesis of 5% (mol/mol) $LiCoO_2$ Gradient Having a $LiNi_{0.87}Co_{0.10}B_{0.03}O_2$ Base.

The experimental procedure used was similar to the procedure of Example 9, but the base material used was $LiNi_{0.87}Co_{0.10}B_{0.03}O_2$ from Example 16.

Example 21

Figure 23:
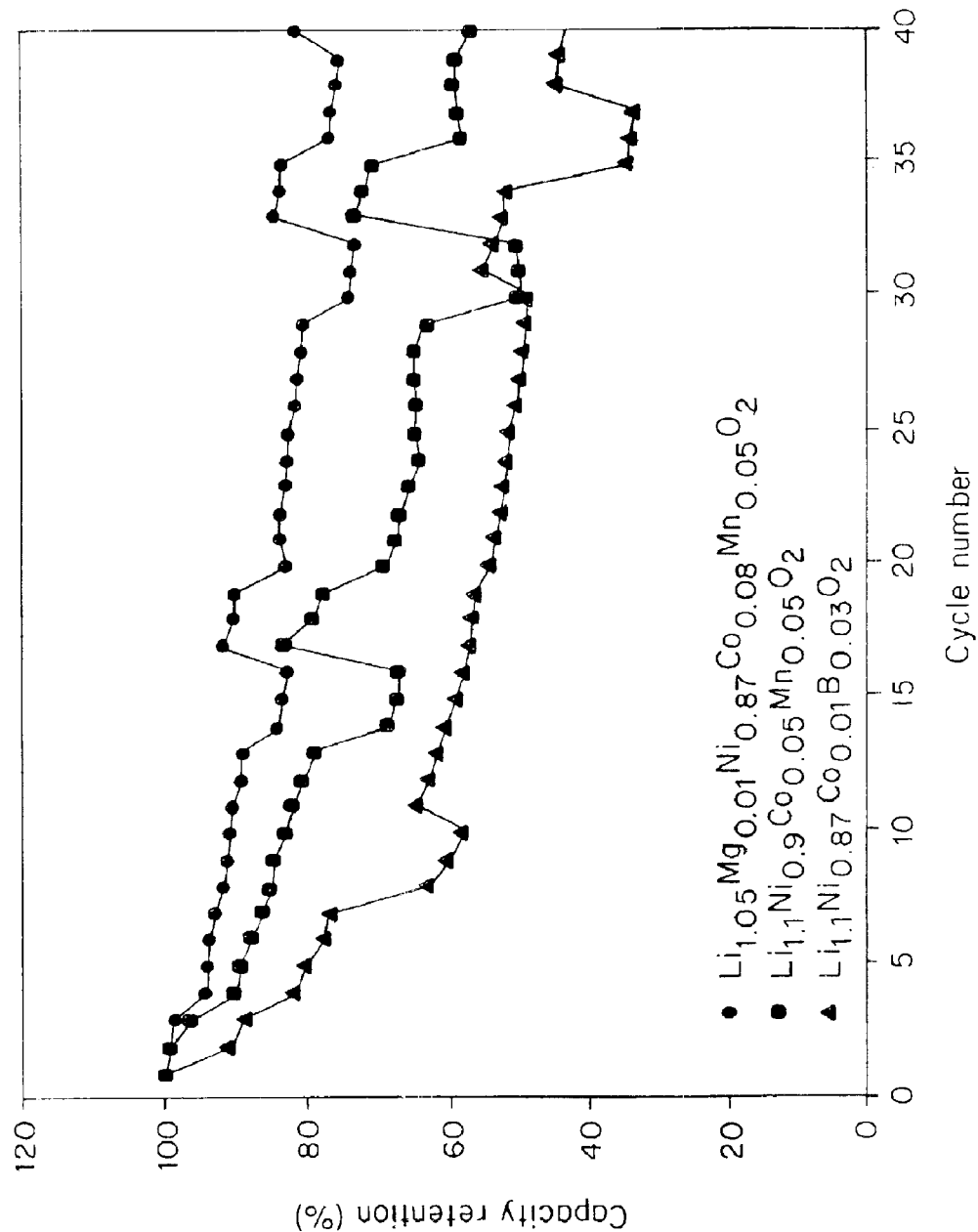
FIG. 23 shows the capacity retention for non-coated samples of Examples 6, 15 and 16.
Figure 24:
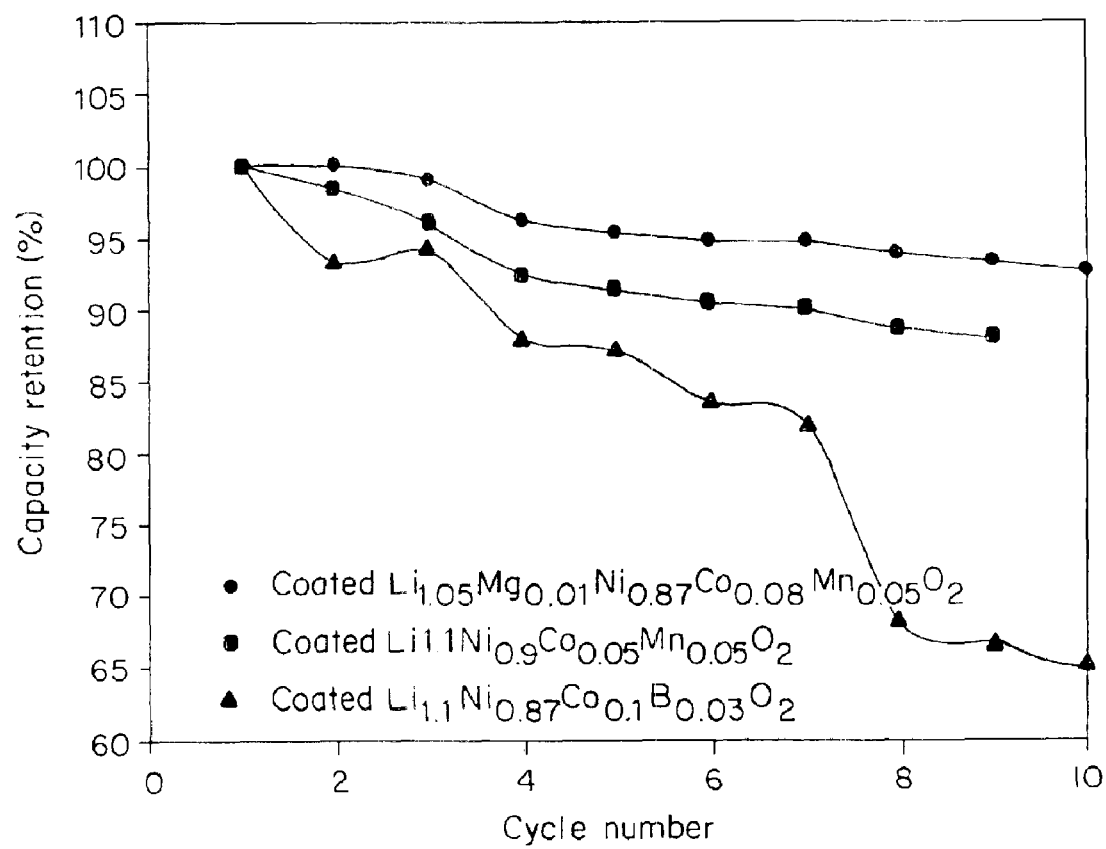
FIG. 24 shows capacity retention for coated samples in Examples 9, 19 and 20.

Samples from Examples 6, 9, 15, 16, 19 and 20 were subjected to electrochemical testing. FIG. 23 is a plot of relative capacity retention for the three base compounds (Examples 6, 15 and 16). FIG. 24 shows relative capacity retention for the 5% $LiCoO_2$ coated compounds, with an obtained gradient profile from calcination (Examples 9, 19 and 20). This shows that $Li_{1.05}Mg_{0.01}Ni_{0.82}Co_{0.08}Mn_{0.05}O_2$ has the overall best capacity retention, which is a preferred embodiment.

Equivalents

While this invention has been particularly shown and described with references to preferred embodiments thereof, it will be understood by those skilled in the art that various changes in form and details may be made therein without departing from the scope of the invention encompassed by the appended claims.

What is claimed is:

1. A composition, comprising:

a) a core having an empirical formula

   $$Li_xM'_zNi_{1-y}M''_yO_2$$

wherein: x is greater than 0.1 and equal to or less than 1.3,
   y is greater than 0.0 and equal to or less than 0.5,
   z is greater than 0.0 and equal to or less than 0.2,
   M' includes magnesium, and
   M" includes cobalt and boron; and b) a coating on the core having a greater ratio of cobalt to nickel than the core.

2. The composition of claim 1, wherein y is in a range of between about 0.1 and about 0.5.
3. The composition of claim 1, wherein y is about 0.1.
4. The composition of claim 1, wherein y is about 0.2.
5. The composition of claim 1, wherein the sum of x and z equals about one.
6. The composition of claim 1, wherein the ratio of cobalt to nickel increases as a gradient from the core to an outer surface of the coating.
7. A composition, comprising:

a) a core having an empirical formula

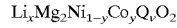
   $$Li_xMg_2Ni_{1-y}Co_yQ_vO_2$$

wherein: x is greater than 0.1 and equal to or less than 1.3.
   y is greater than 0.0 and equal to or less than 0.4,
   z is greater than 0.0 and equal to or less than 0.2,
   v is greater than 0.0 and equal to or less than 0.4,
   Q is at least one member of the group consisting of manganese, boron, aluminum and gallium; and b) a coating on the core having a greater ratio of cobalt to nickel than the core.

* * * * *